(12) United States Patent
Robinson

(10) Patent No.: US 9,849,325 B1
(45) Date of Patent: Dec. 26, 2017

(54) ADJUSTABLE STRAP APPARATUS AND METHOD FOR USE

(71) Applicant: Heartfelt Designs, Inc., Champaign, IL (US)

(72) Inventor: Cheryl Faust Robinson, Champaign, IL (US)

(73) Assignee: Heartfelt Designs, Inc., Champaign, IL (US)

( * ) Notice: Subject to any disclaimer, the term of this patent is extended or adjusted under 35 U.S.C. 154(b) by 322 days.

(21) Appl. No.: 14/736,585

(22) Filed: Jun. 11, 2015

Related U.S. Application Data

(60) Provisional application No. 62/011,640, filed on Jun. 13, 2014.

(51) Int. Cl.
*A63B 69/00* (2006.01)
*A63B 21/00* (2006.01)
*G09B 19/00* (2006.01)

(52) U.S. Cl.
CPC ...... *A63B 21/00185* (2013.01); *G09B 19/003* (2013.01)

(58) Field of Classification Search
USPC ........... 434/247; 482/92, 121, 122, 124–126, 482/131; 224/219–221, 250
See application file for complete search history.

(56) References Cited

U.S. PATENT DOCUMENTS

| | | | | |
|---|---|---|---|---|
| 4,982,885 A * | 1/1991 | Severson | ............... | A45C 13/30 224/250 |
| 5,044,538 A * | 9/1991 | Bader | ............... | A45F 3/14 224/250 |
| 5,460,308 A * | 10/1995 | Hahn | ............... | A45F 3/14 224/250 |
| 5,498,218 A * | 3/1996 | Proctor | ............... | A63B 23/025 482/10 |
| 5,711,747 A * | 1/1998 | Steinback | ............... | A63B 21/0004 482/122 |
| 6,036,625 A * | 3/2000 | Woodruff | ............... | A63B 21/0552 482/121 |
| 6,168,556 B1 * | 1/2001 | Saavedra | ............... | A63B 21/4021 224/220 |
| 6,564,385 B2 * | 5/2003 | McCarthy | ............... | A63B 21/4021 2/16 |
| 6,606,768 B2 * | 8/2003 | Henry | ............... | A45F 5/00 24/298 |
| 6,921,354 B1 * | 7/2005 | Shifferaw | ............... | A63B 21/068 482/126 |

(Continued)

*Primary Examiner* — Kurt Fernstrom
(74) *Attorney, Agent, or Firm* — Singleton Law Firm, P.C.

(57) ABSTRACT

Embodiments of the present invention provide an adjustable strap apparatus and methods of instructing a patient to perform an exercise using the adjustable strap apparatus. An apparatus according to embodiments of the present invention includes a strap, a plurality of hook patches and a plurality of loop patches joined thereto. A hook patch and a loop patch of the present invention are removably engageable to form pull loops from ends of the apparatus and to form a pull belt between the pull loops. A therapist may instruct a patient to perform a mobilization exercise or a stretching exercise by forming pull loops about extremities of the patient and pulling on the apparatus without grasping to exert a stabilization force or resistance force upon a part of the body of the patient.

4 Claims, 28 Drawing Sheets

(56) References Cited

U.S. PATENT DOCUMENTS

| | | | | |
|---|---|---|---|---|
| 7,004,889 B2* | 2/2006 | McBride | ............ | A63B 21/4021 |
| | | | | 482/49 |
| 8,241,232 B2* | 8/2012 | Sanders | ............... | A61H 1/0266 |
| | | | | 36/11.5 |
| 8,747,284 B2* | 6/2014 | Ingram | ............... | A63B 21/1442 |
| | | | | 482/106 |
| 8,840,532 B2* | 9/2014 | Hetrick | ............... | A44B 11/2557 |
| | | | | 482/126 |
| 8,858,408 B2* | 10/2014 | DeMeo | ............ | A63B 21/00185 |
| | | | | 482/131 |
| 9,630,081 B2* | 4/2017 | Gillespie | ............ | A63B 71/0054 |
| 2005/0050696 A1* | 3/2005 | Essick | ....................... | A45F 5/00 |
| | | | | 24/306 |
| 2006/0183609 A1* | 8/2006 | Flynn | ................ | A63B 21/0004 |
| | | | | 482/124 |
| 2007/0066450 A1* | 3/2007 | Hetrick | ............... | A63B 21/0023 |
| | | | | 482/91 |
| 2013/0059702 A1* | 3/2013 | Page | ................ | A63B 21/0442 |
| | | | | 482/125 |
| 2013/0303344 A1* | 11/2013 | Rasnake | ................ | A63B 21/02 |
| | | | | 482/124 |
| 2015/0157893 A1* | 6/2015 | Canevari | ............ | A63B 21/4035 |
| | | | | 482/129 |
| 2015/0290020 A1* | 10/2015 | Carpenter | ............... | A61F 5/042 |
| | | | | 482/91 |

* cited by examiner

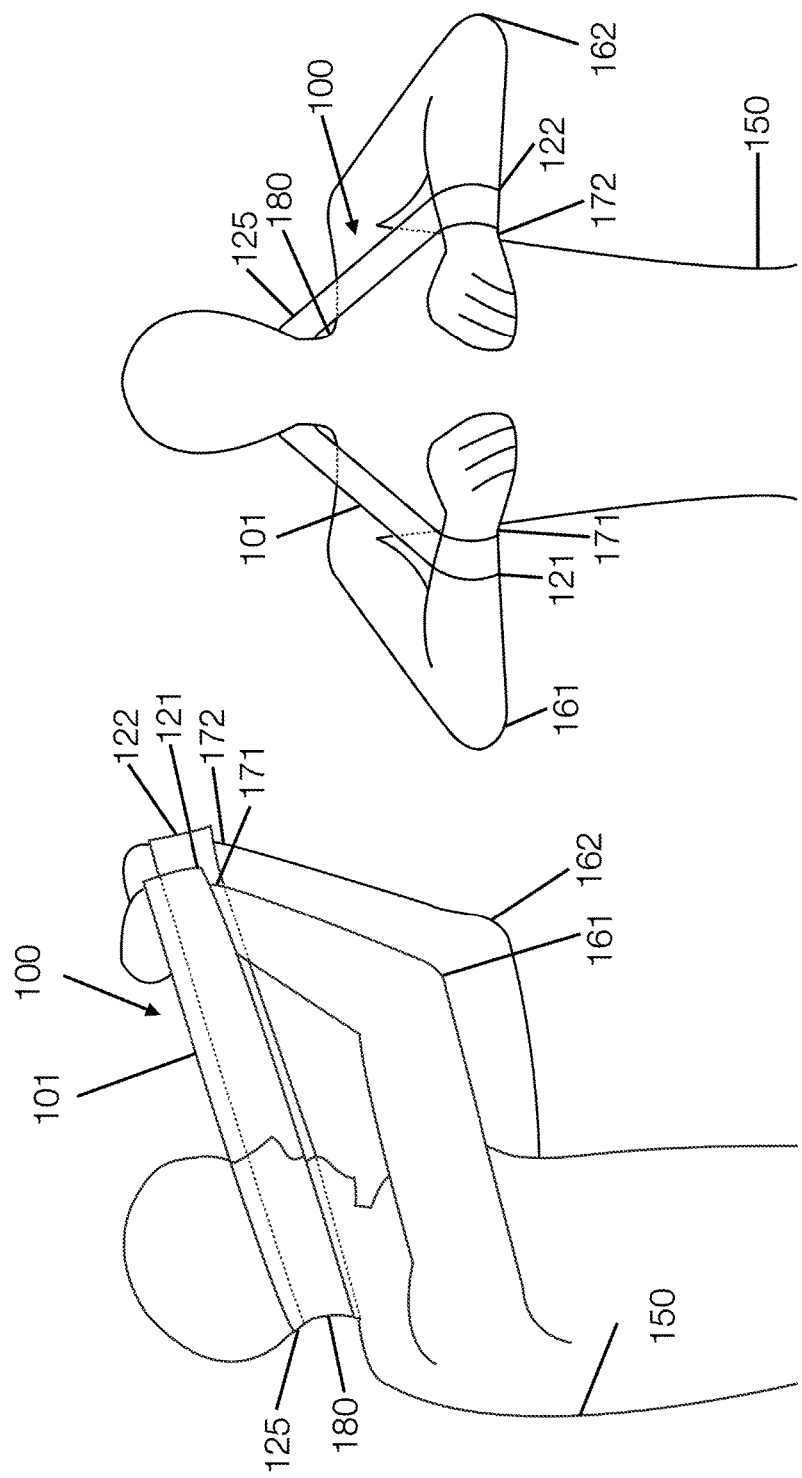

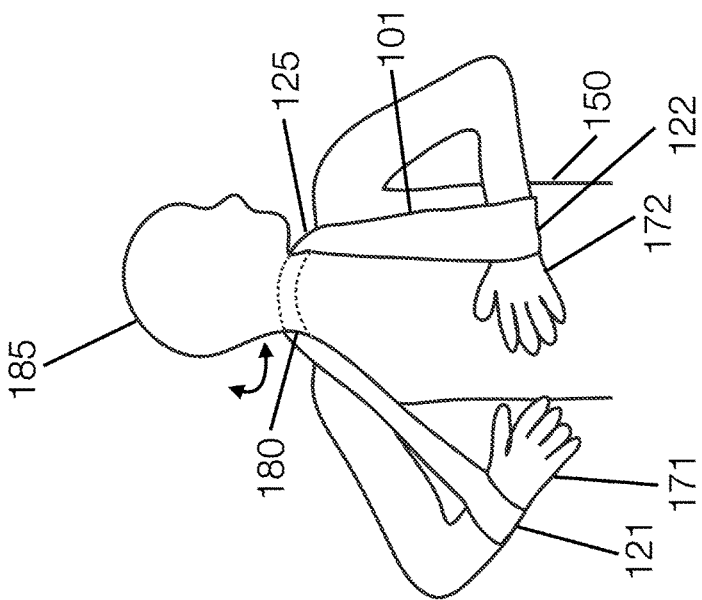
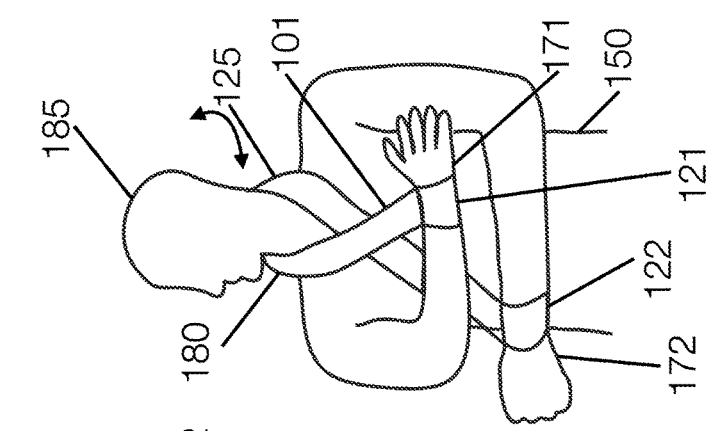
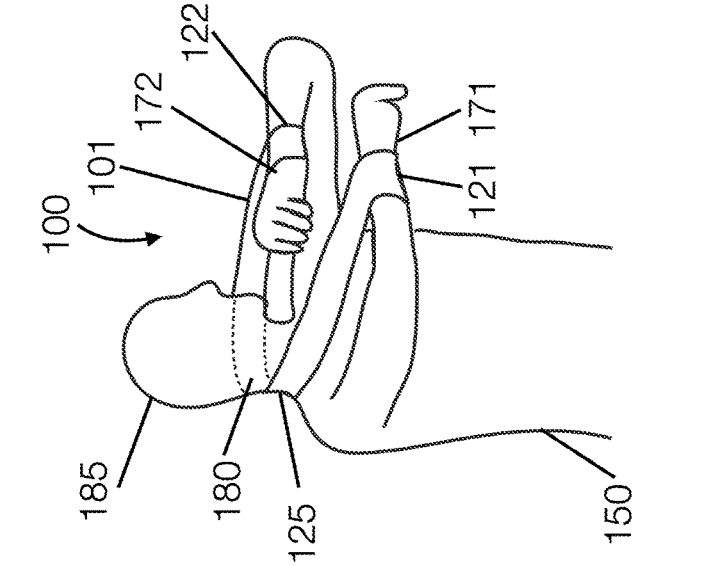
Figure 4D
Figure 4C
Figure 4B

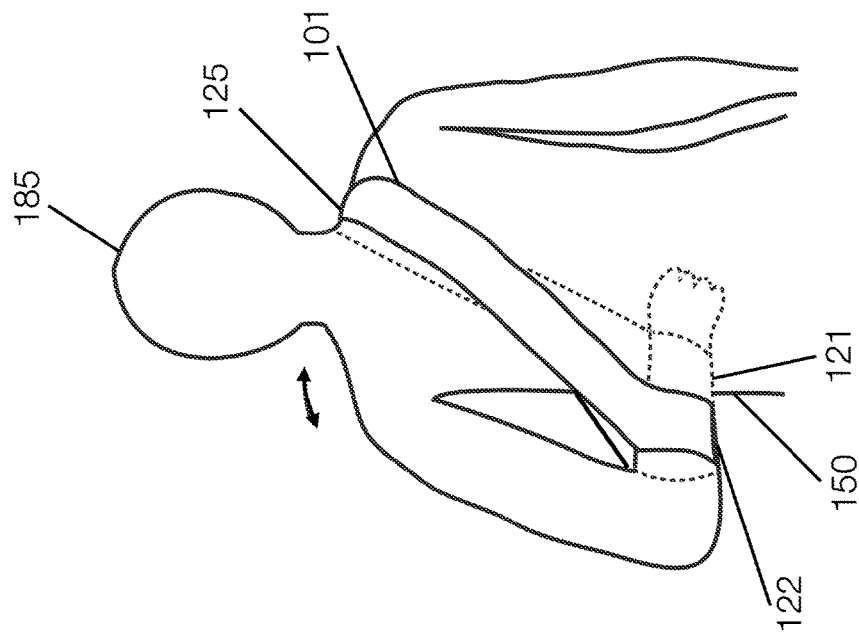
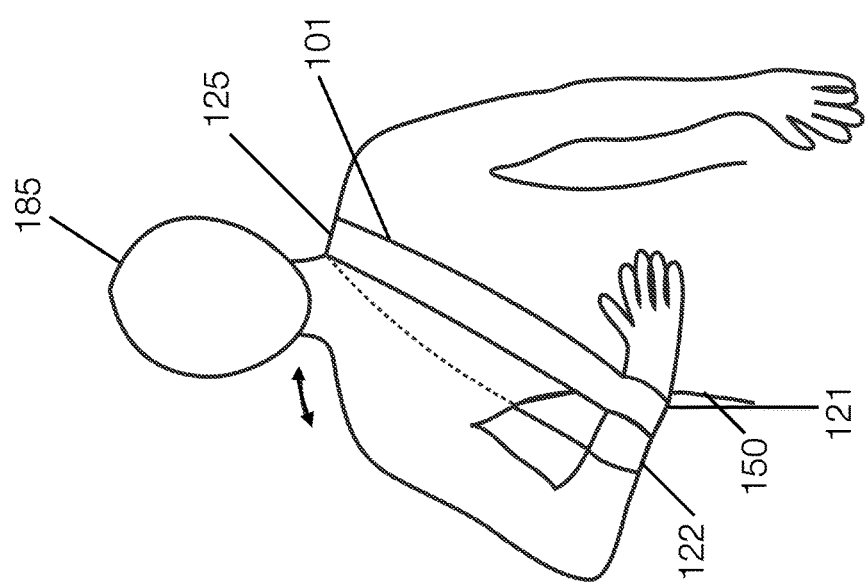

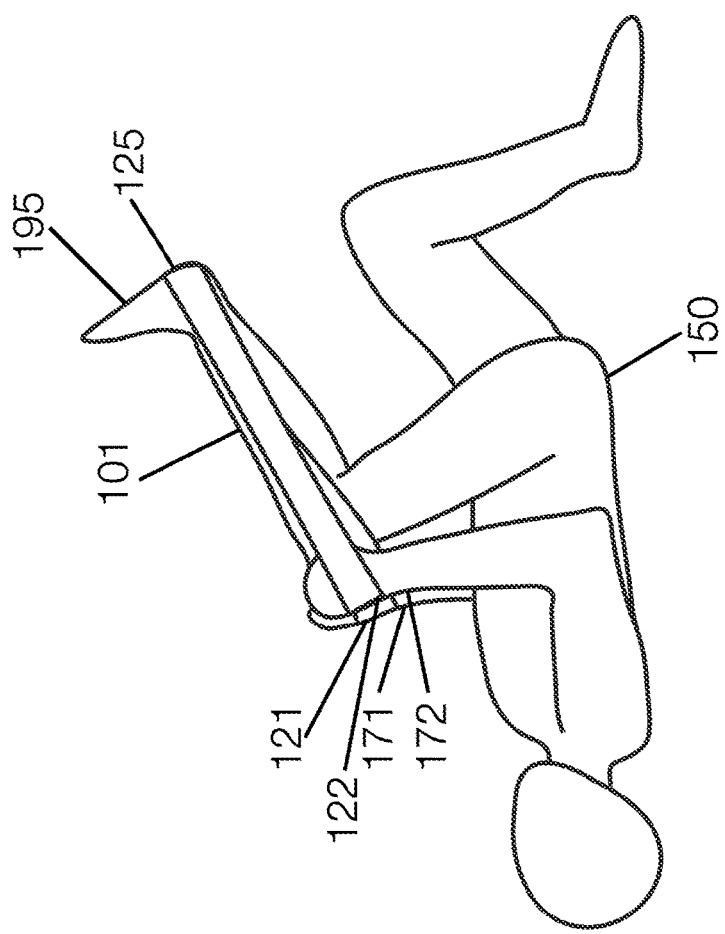

ADJUSTABLE STRAP APPARATUS AND METHOD FOR USE

CROSS-REFERENCE TO RELATED APPLICATIONS

The present application claims the benefit of U.S. Provisional Patent Application No. 62/011,640, filed Jun. 13, 2014. Each above-mentioned patent application is hereby incorporated by reference in its entirety.

BACKGROUND OF THE INVENTION

The present invention generally relates to physical therapy. More particularly, the present invention relates to an orthopedic apparatus for physical therapy and methods for instructing exercises using the orthopedic apparatus.

The neck and back of the human body are often susceptible to various ailments and injuries. To combat the stress and injuries that the neck and back incur, physical therapists have developed exercises to help heal and strengthen the neck and back muscles. One of the exercises involves stretching the neck muscle by wrapping a towel around the neck, grasping each end of the towel with each hand and pulling the towel against the neck. This exercise, however, could not work for patients who could not grasp the towel, due to conditions such as hand injuries.

BRIEF SUMMARY OF THE INVENTION

One or more embodiments of the present invention provide a strap with two strap ends, a plurality of hook patches, and a plurality of loop patches. According to an embodiment of the present invention, to a face of the strap are joined first and second outer hook patches, first and second inner hook patches, first and second outer lateral loop patches, first and second inner lateral loop patches, and a medial loop patch. A hook patch is removably engageable with a loop patch to form a pull loop. A pull belt may be formed by forming pull loops at both ends of the strap.

A therapist may observe an indication in a part of the body of a patient and instruct a patient to perform a mobilization exercise or a stretching exercise at that part of the body of the patient. A therapist may instruct the patient to use the strap by forming a first pull loop and a second pull loop about extremities of the patient. A therapist may then instruct the patient to exert pulling forces upon the strap without grasping the first pull loop and the second pull loop with a hand of the patient. A therapist may then instruct the patient to perform a mobilization exercise or a stretching exercise at a part of the body of the patient while self-applying a stabilization force or a resistance force using the strap.

BRIEF DESCRIPTION OF THE DRAWINGS

FIGS. 2B and 2C illustrate a patient using the adjustable strap apparatus of FIG. 1 as directed by a therapist according to steps of the elbow extension mobilization exercise method.

FIGS. 4B through 4D illustrate a patient using the adjustable strap apparatus of FIG. 1 as directed by a therapist according to steps of the cervical mobilization exercise method.

FIGS. 5B and 5C illustrate a patient using the adjustable strap apparatus of FIG. 1 as directed by a therapist according to a step of the cervical side bend mobilization exercise method.

FIG. 10B illustrates a patient using the adjustable strap apparatus of FIG. 1 as directed by a therapist according to a step of the soleus stretch exercise method.

DETAILED DESCRIPTION OF THE INVENTION

Embodiments of the present invention provide an adjustable strap apparatus and methods to instruct a patient to use the adjustable strap apparatus to apply a stabilizing force or a resistance force to the patient body without the use of hands while performing an exercise method.

Figure 1:
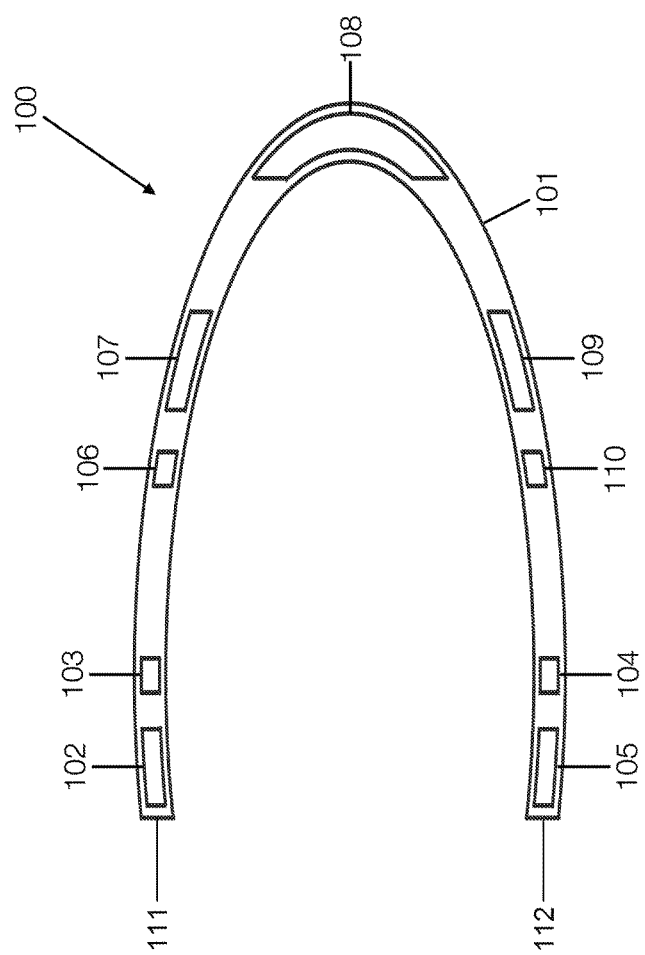
FIG. 1 illustrates an adjustable strap apparatus according to an embodiment of the present invention.

FIG. 1 illustrates an adjustable strap apparatus 100 according to an embodiment of the present invention. The adjustable strap apparatus 100 is formed from a strap 101 having a first strap end 111 and a second strap end 112. To a face of the strap 101 are joined first and second outer hook patches 102 and 105, first and second inner hook patches 103 and 104, first and second outer lateral loop patches 106 and 110, first and second inner lateral loop patches 107 and 109, and a medial loop patch 108. A hook patch is defined as a hook of a hook and loop fastener. A loop patch is defined as a loop of a hook and loop fastener.

According to an embodiment of the present embodiment, the strap 101 may be a polyester webbing strap having a 5000-pound breaking strength. The strap 101 may have a length of approximately 85 inches and a width of approximately 1 and ⅞ inches. The first and second outer hook patches 102 and 105 may each be a Velcro hook patch having a length of 6 inches and a width of 1 and ½ inches. The first and second inner hook patches 103 and 104 may each be a Velcro hook patch having a length of 2 inches and a width of 1 and ½ inches. The first and second outer lateral loop patches 106 and 110 may each be a Velcro loop patch having a length of 2 inches and a width of 1 and ½ inches. The first and second inner lateral loop patches 107 and 109 may each be a Velcro loop patch having a length of 6 inches and a width of 1 and ½ inches. The medial loop patch 108 may be a Velcro loop patch having a length of 10 to 16 inches and a width of 1 and ½ inches.

According to embodiments of the present invention, a hook patch of the strap 101 may be engaged to a loop patch of the strap 101 to form a pull loop from the length of the strap 101 between the engaged hook patch and the engaged loop patch. A length of the strap 101 not forming the pull loop forms a pull belt. Various configurations of the present invention may be created in this manner. The lengths of the intervals of the strap 101 separating the hook patches and the loop patches may be configured such that particular portions of the strap 101 match approximately particular measurements of a patient body in the configurations recited below. Exact dimensions may vary to match the body builds of particular patients.

According to one configuration of the present invention, the first outer hook patch 102 is removably engaged with the first outer lateral loop patch 106 to form a pull loop from the length of the strap 101 between the first outer hook patch 102 and the first outer lateral loop patch 106. The lengths of the intervals of the strap 101 may be configured such that the length from the medial point of the strap 101 to the end of this pull loop is approximately equal to half the arm span of a patient measured to the fingertips.

According to another configuration of the present invention, the first outer hook patch 102 is removably engaged with both the first outer lateral loop patch 106 and the first inner lateral loop patch 107 to form a pull loop from the length of the strap 101 between the first outer hook patch 102 and the first outer lateral loop patch 106. The lengths of the intervals of the strap 101 may be configured such that the length from the medial point of the strap 101 to the end of this pull loop is approximately equal to half the arm span of a patient measured to the wrists.

According to another configuration of the present invention, the first outer hook patch 102 is removably engaged with the first inner lateral loop patch 107 and the first inner hook patch 103 is removably engaged with the first outer lateral loop patch 106 to form a pull loop from the length of the strap 101 between the first inner hook patch 103 and the first outer lateral loop patch 106. The lengths of the intervals of the strap 101 may be configured such that the length from the medial point of the strap 101 to the end of this pull loop is approximately equal to the length of an extended arm of a patient.

According to another configuration of the present invention, the first outer hook patch 102 is removably engaged with the medial loop patch 108 to form a pull loop from the length of the strap 101 between the first outer hook patch 102 and the medial loop patch 108. The lengths of the intervals of the strap 101 may be configured such that the length from the medial point of the strap 101 to the end of this pull loop is approximately equal to half the length of an extended leg of a patient.

According to another configuration of the present invention, the first outer hook patch 102 is removably engaged with the medial loop patch 108 and the first inner hook patch 103 is removably engaged with the first inner lateral loop patch 107 to form a pull loop from the length of the strap 101 between the first inner hook patch 103 and the first inner lateral loop patch 107. The lengths of the intervals of the strap 101 may be configured such that the length from the medial point of the strap 101 to the end of this pull loop is approximately equal to the length of a lower leg of a patient.

According to another configuration of the present invention, the second outer hook patch 105 is removably engaged with the second outer lateral loop patch 110 to form a pull loop from the length of the strap 101 between the second outer hook patch 105 and the second outer lateral loop patch 110. The lengths of the intervals of the strap 101 may be configured such that the length from the medial point of the strap 101 to the end of this pull loop is approximately equal to half the arm span of a patient measured to the fingertips.

According to another configuration of the present invention, the second outer hook patch 105 is removably engaged with both the second outer lateral loop patch 110 and the second inner lateral loop patch 109 to form a pull loop from the length of the strap 101 between the second outer hook patch 105 and the second inner lateral loop patch 109. The lengths of the intervals of the strap 101 may be configured such that the length from the medial point of the strap 101 to the end of this pull loop is approximately equal to half the arm span of a patient measured to the wrists.

According to another configuration of the present invention, the second outer hook patch 105 is removably engaged with the second inner lateral loop patch 109 and the second inner hook patch 104 is removably engaged with the second outer lateral loop patch 110 to form a pull loop from the length of the strap 101 between the second inner hook patch 104 and the second inner lateral loop patch 109. The lengths of the intervals of the strap 101 may be configured such that the length from the medial point of the strap 101 to the end of this pull loop is approximately equal to the length of an extended arm of a patient.

According to another configuration of the present invention, the second outer hook patch 105 is removably engaged with the medial loop patch 108 to form a pull loop from the length of the strap 101 between the second outer hook patch 105 and the medial loop patch 108. The lengths of the intervals of the strap 101 may be configured such that the length from the medial point of the strap 101 to the end of this pull loop is approximately equal to half the length of an extended leg of a patient.

According to another configuration of the present invention, the second outer hook patch 105 is removably engaged with the medial loop patch 108 and the second inner hook patch 104 is removably engaged with the inner lateral loop patch 109 to form a pull loop from the length of the strap 101 between the second inner hook patch 104 and the inner lateral loop patch 109. The lengths of the intervals of the strap 101 may be configured such that the length from the medial point of the strap 101 to the end of this pull loop is approximately equal to the length of a lower leg of a patient.

A joint of a patient may have a joint range of motion, which may refer to a distance range over which the joint may move. A muscle of a patient may have a muscle range of motion, which may refer to a distance range over which the muscle may push.

According to embodiments of the present invention, a therapist may examine a patient in order to determine whether the patient exhibits a joint mobilization indication and whether the patient exhibits a stretching indication.

A joint mobilization indication may be an observable characteristic which conveys to the therapist that prescribing the performance of a joint mobilization exercise by the patient may accomplish a joint mobilization goal. Examples of joint mobilization indications may include joint weakness or pain; muscle spasms; or reduced joint range of motion. Examples of joint mobilization goals may include decreasing pain; decreasing muscle spasms; or increasing joint range of motion.

A stretching indication may be an observable characteristic which conveys to the therapist that prescribing the performance of a stretching exercise by the patient may accomplish a stretching goal. Examples of stretching indications may include muscle injury or contracture around joints leading to reduction of joint range of motion, or muscle tightness. Examples of stretching goals may include increasing joint range of motion by lengthening muscles around a joint, or increasing muscle flexibility.

Generally, exercise methods provided by embodiments of the present invention may be a mobilization exercise or a stretching exercise. A mobilization exercise may refer to a motion that oscillates a joint within a joint range of motion, to the limit of a joint range of motion, or beyond a joint range of motion. During a mobilization exercise, a stabilization force may be applied to a moving part of the patient body.

A stretching exercise may refer to contracting a muscle to elongate beyond a muscle range of motion. Particularly, a passive stretching exercise may refer to an isometric contraction of a muscle against the application of a resistance force to a patient body part, meaning that the contraction of the muscle does not induce movement of the patient body part. During a stretching exercise, the resistance force applied to the non-moving patient body part may be self-applied by the patient, or may be applied by a source external to the patient body.

According to mobilization exercise embodiments of the present invention, a patient may self-apply a stabilization force to the patient body during a mobilization exercise using an adjustable strap apparatus of FIG. 1. According to stretching exercise embodiments of the present invention, a patient may self-apply an external resistance force to the patient body during a mobilization exercise using an adjustable strap apparatus of FIG. 1.

Mobilization exercise embodiments of the present invention may provide an extension exercise method. An extension exercise may refer to a motion moving an extremity of a body away such that segments of the body move further apart from each other.

Mobilization exercise embodiments of the present invention may provide an external or an internal rotation exercise method. An external rotation exercise may refer to a motion rotating a part of a body away from the body. An internal rotation exercise may refer to a motion rotating a part of a body towards the body.

Figure 2A:
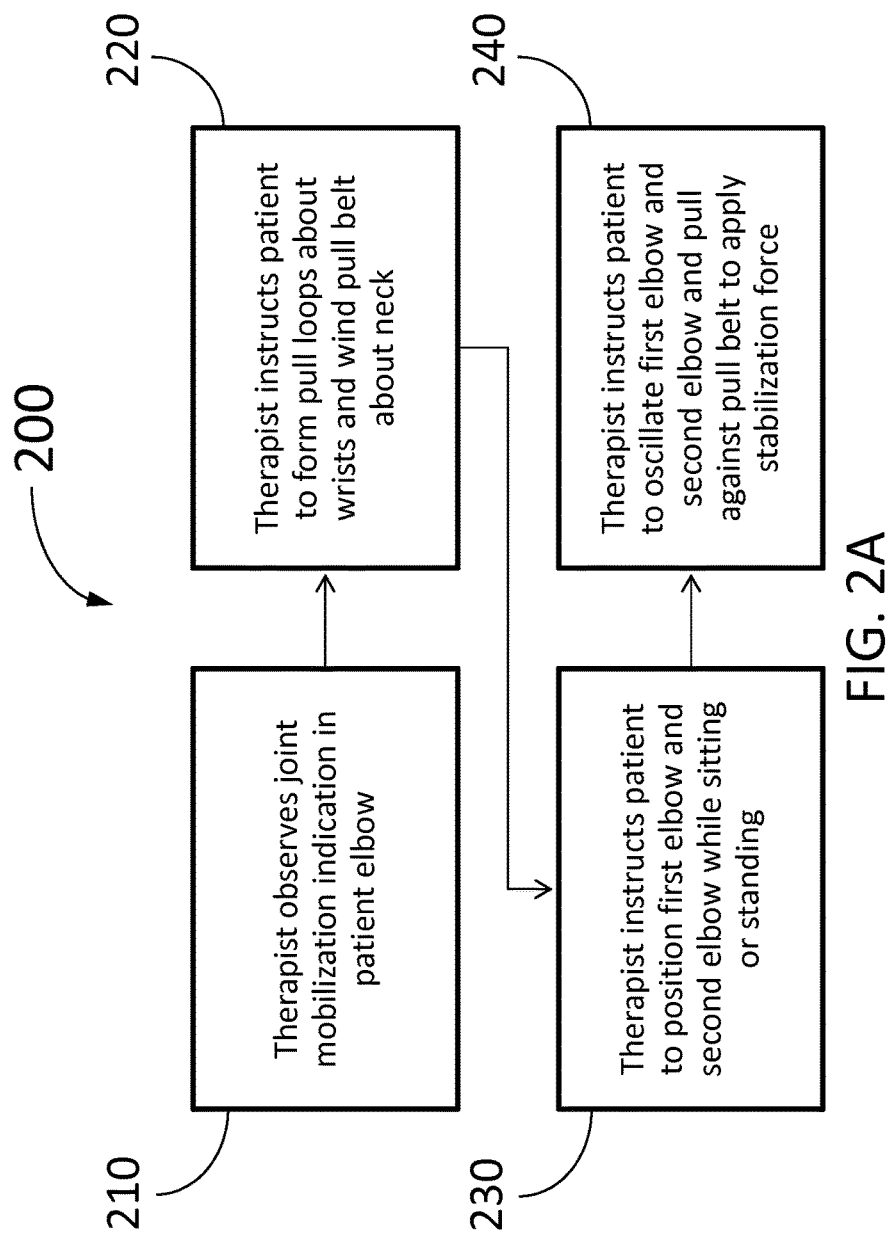
FIG. 2A illustrates an elbow extension mobilization exercise method according to an embodiment of the present invention.

FIG. 2A illustrates an elbow extension mobilization exercise method 200 according to an embodiment of the present invention. According to a first step 210 of the mobilization exercise method 200, a therapist may observe a joint mobilization indication in an elbow joint of a patient. An elbow joint exhibiting a joint mobilization indication may be, for example, a humeroulnar joint, a humeroradial joint, or a radioulnar joint.

According to a next step 220 of the elbow extension mobilization exercise method 200, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to engage the second outer hook patch 105 with one of the outer lateral loop patch 110, the inner lateral loop patch 109, or the medial loop patch 108 to form a pull loop about a second wrist of the patient; and instruct the patient to rest a length of the strap 101 forming a pull belt posteriorly against the neck of the patient.

According to a next step 230 of the elbow extension mobilization exercise method 200, the therapist may instruct the patient to, while sitting or standing, position a first elbow and a second elbow of the patient each anteriorly in upraised postures ("start positions") such that while the first forearm and the second forearm are raised, the pull belt portion of the strap 101 is wound posteriorly about the neck of the patient; and such that the pull loop about the first wrist of the patient and the pull loop about the second wrist of the patient are each raised approximately level to the eye level of the patient.

According to a next step 240 of the elbow extension mobilization exercise method 200, the therapist may direct the patient to oscillate the first elbow and the second elbow within a range inferior and posterior to the start positions, such that during the course of these oscillations, the first wrist and the second wrist may pull anteriorly against the pull belt wound posteriorly about the neck without a hand of the patient grasping the first pull loop or the second pull loop, to apply a stabilization force against the first elbow and the second elbow.

FIG. 2B illustrates a patient 150 using the adjustable strap apparatus 100 as directed by a therapist according to step 230 of the elbow extension mobilization exercise method 200. The first elbow 161 and the second elbow 162 of the patient 150 are positioned in start positions. A first pull loop 121 is about the first wrist 171 of the patient 150, and a second pull loop 122 is about the second wrist 172 of the patient 150. A pull belt 125 is wound posteriorly about the neck 180 of the patient 150.

FIG. 2C illustrates a patient 150 using the adjustable strap apparatus 100 as directed by a therapist according to step 240 of the elbow extension mobilization exercise method 200. The first elbow 161 and the second elbow 162 of the patient 150 are oscillating within a range inferior and posterior to the start positions. The first wrist 171 and the second wrist 172 of the patient 150 pull anteriorly against the pull belt 125 wound posteriorly about the neck 180 of the patient 150 without a hand of the patient 150 grasping the first pull loop or the second pull loop.

Figure 3A:
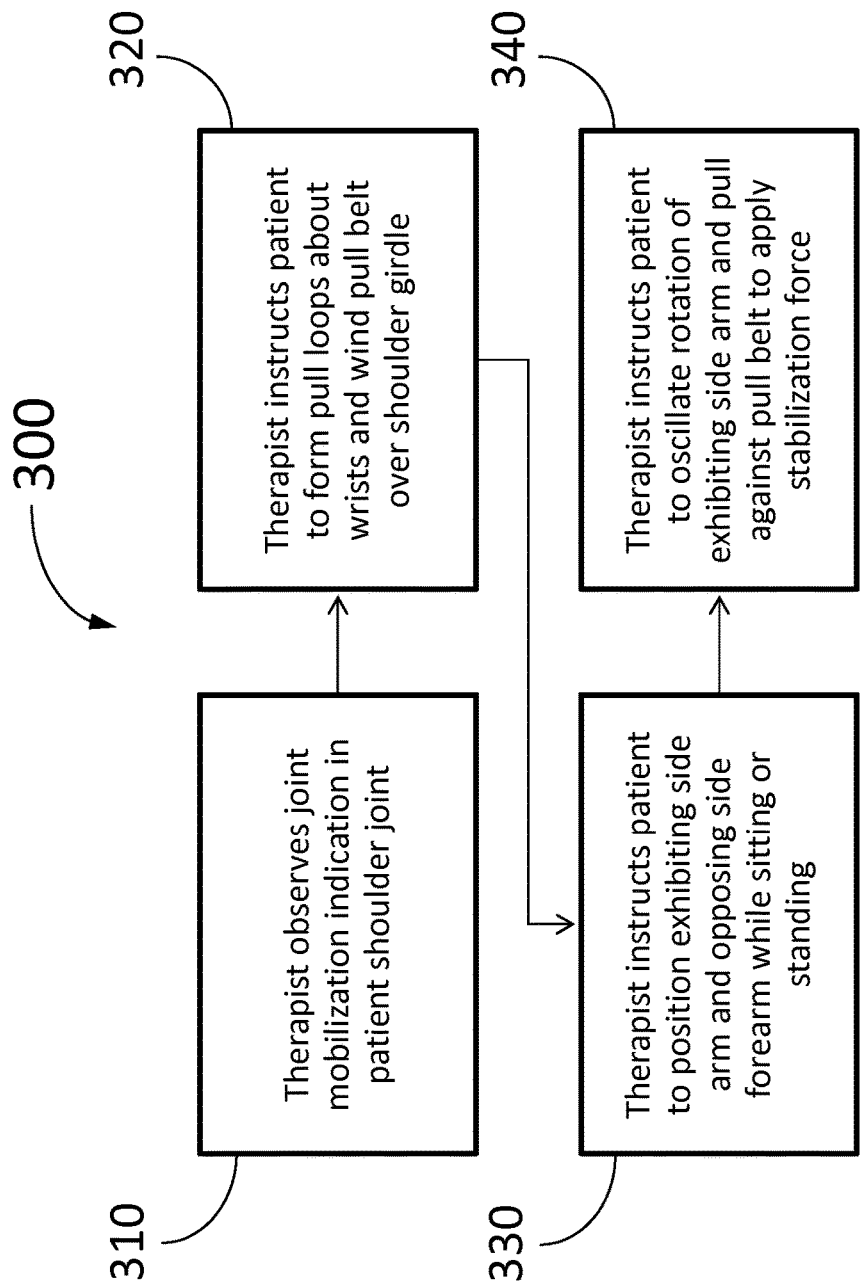
FIG. 3A illustrates a shoulder rotation mobilization exercise method according to an embodiment of the present invention.

FIG. 3A illustrates a shoulder rotation mobilization exercise method 300 according to an embodiment of the present invention. According to a first step 310 of the shoulder rotation mobilization exercise method 300, a therapist may observe a joint mobilization indication in a shoulder joint of a patient. A shoulder joint exhibiting a joint mobilization indication may be the left shoulder joint or the right shoulder joint of the patient, where the side of the shoulder joint exhibiting the joint mobilization indication is referred to as the "exhibiting side," and the side of the shoulder joint other than the shoulder joint exhibiting the joint mobilization indication is referred to as the "opposing side." A shoulder joint exhibiting a joint mobilization indication may be a glenohumeral joint.

According to a next step 320 of the shoulder rotation mobilization exercise method 300, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to engage the second outer hook patch 105 with one of the outer lateral loop patch 110, the inner lateral loop patch 109, or the medial loop patch 108 to form a pull loop about a second wrist of the patient; and instruct the patient to wind a length of the strap 101 forming a pull belt posteriorly over the opposing side shoulder girdle of the patient and under the exhibiting side arm of the patient.

According to a next step 330 of the shoulder rotation mobilization exercise method 300, the therapist may instruct the patient to, while sitting or standing, raise the exhibiting side arm towards a lateral orientation and position the opposing side forearm of the patient anteriorly in a leveled posture such that the pull loop about the first wrist of the patient and the pull loop about the second wrist of the patient are each raised approximately level to the abdomen of the patient, positioned lateral to each other, such that the pull belt portion of the strap 101 is pulled taut posteriorly over the opposing side shoulder girdle of the patient and under the exhibiting side arm of the patient.

According to a next step 340 of the shoulder rotation mobilization exercise method 300, the therapist may direct the patient to rotate internally or externally the exhibiting side arm laterally within a range, and then direct the patient to oscillate the rotation of the exhibiting side arm within a range of the rotation, such that during the course of the oscillations, the first wrist and the second wrist may pull anteriorly against the pull belt wound posteriorly over the opposing side shoulder girdle of the patient and under the exhibiting side arm of the patient without a hand of the patient grasping the first pull loop or the second pull loop, to apply a stabilization force against the exhibiting side shoulder joint of the patient.

Figure 3B:
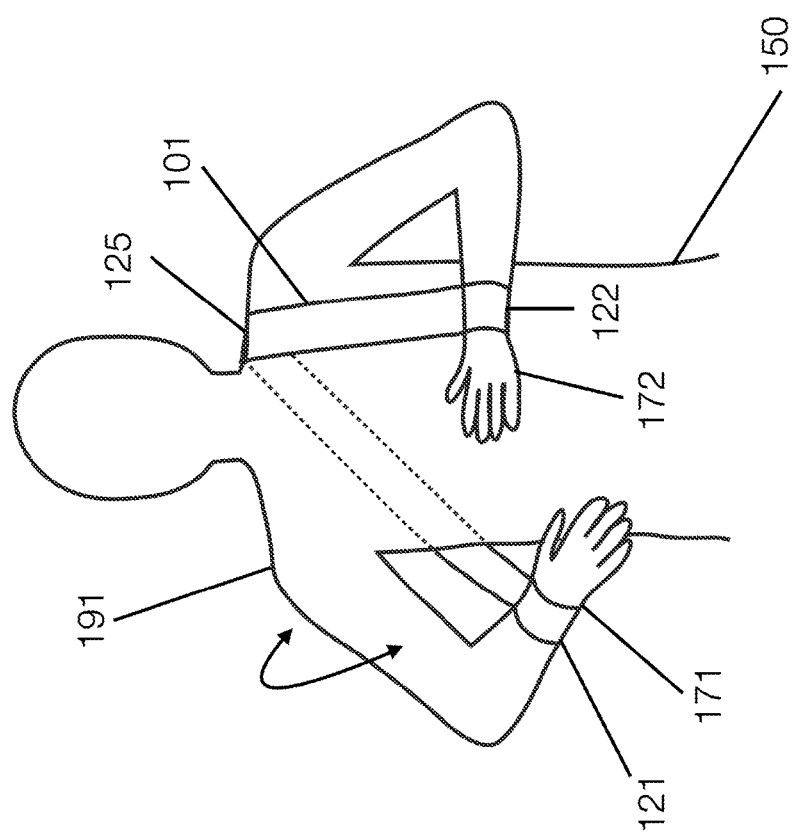
FIG. 3B illustrates a patient using the adjustable strap apparatus of FIG. 1 as directed by a therapist according to a step of the shoulder rotation mobilization exercise method.

FIG. 3B illustrates a patient 150 using the adjustable strap apparatus 100 as directed by a therapist according to step 340 of the shoulder rotation mobilization exercise method 300. The exhibiting side shoulder joint 191 of the patient 150 is oscillating within a range. The first wrist 171 and the second wrist 172 of the patient 150 pull anteriorly against the pull belt 125 pulled taut posteriorly over the opposing side shoulder girdle of the patient and under the exhibiting side arm of the patient without a hand of the patient 150 grasping the first pull loop or the second pull loop.

Figure 4A:
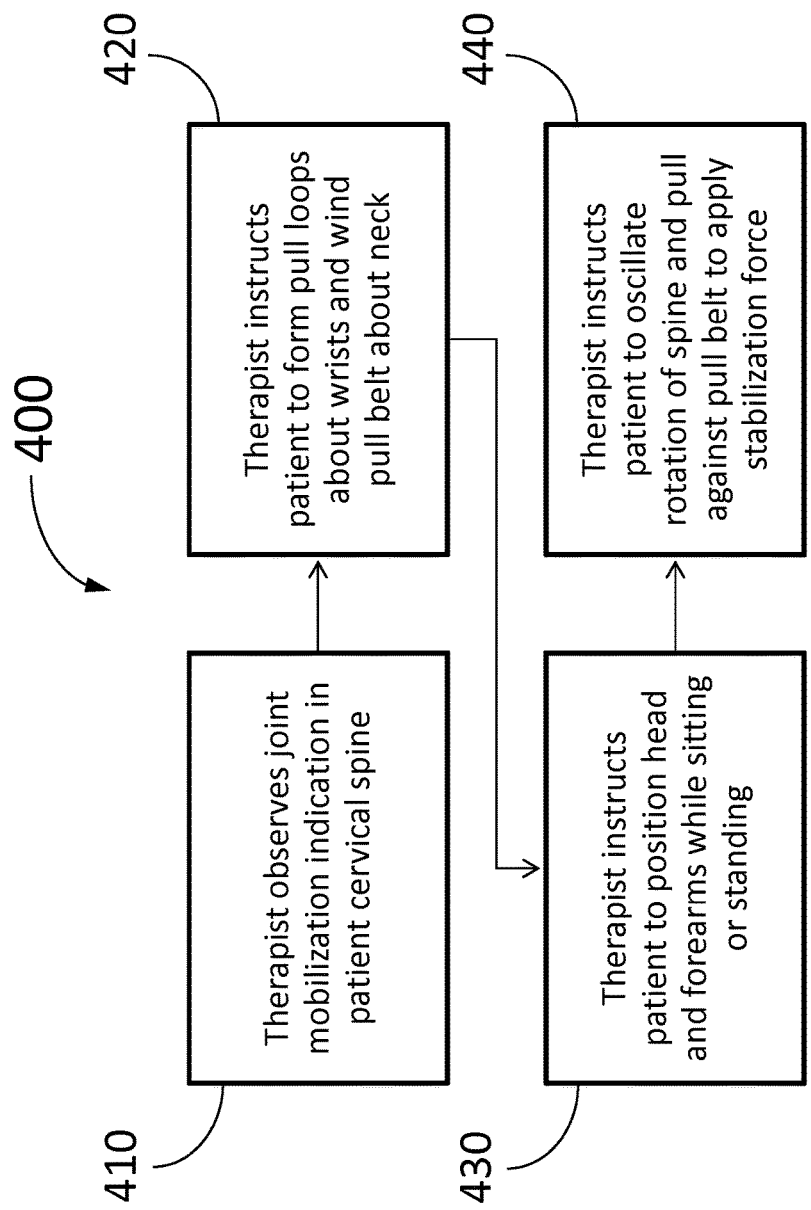
FIG. 4A illustrates a cervical mobilization exercise method according to an embodiment of the present invention.

FIG. 4A illustrates a cervical mobilization exercise method 400 according to an embodiment of the present invention. According to a first step 410 of the cervical mobilization exercise method 400, a therapist may observe a rotational joint mobilization indication in the cervical spine of a patient.

According to a next step 420 of the cervical mobilization exercise method 400, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to engage the second outer hook patch 105 with one of the outer lateral loop patch 110, the inner lateral loop patch 109, or the medial loop patch 108 to form a pull loop about a second wrist of the patient; and instruct the patient to wind a length of the strap 101 forming a pull belt posteriorly about the neck of the patient.

According to a next step 430 of the cervical mobilization exercise method 400, the therapist may instruct the patient to, while sitting or standing, position the head of the patient facing anteriorly (the "start position") and position a first forearm and a second forearm of the patient each anteriorly in leveled postures such that while the first elbow and the second elbow are relaxed, the pull belt portion of the strap 101 winds posteriorly about the neck of the patient; and such that the pull loop about the first wrist of the patient and the pull loop about the second wrist of the patient are each raised approximately level to the chest of the patient, where the first forearm and the second forearm of the patient may be positioned vertically overlapping, or the first forearm and the second forearm may be positioned laterally level with each other.

According to a next step 440 of the cervical mobilization exercise method 400, the therapist may direct the patient to rotate the head of the patient laterally to the end of a range either left of the start position or right of the start position, and then direct the patient to oscillate the rotation of the spine of the patient within the range left of the start position or within the range right of the start position, such that during the course of the oscillations, the first wrist and the second wrist may pull anteriorly against the pull belt wound posteriorly about the neck without a hand of the patient grasping the first pull loop or the second pull loop, to apply a stabilization force against the spine of the patient.

FIG. 4B illustrates a patient 150 using the adjustable strap apparatus 100 as directed by a therapist according to step 430 of the cervical mobilization exercise method 300. The head 185 of the patient 150 is positioned in the start position. A first pull loop 121 is about the first wrist 171 of the patient 150, and a second pull loop 122 is about the second wrist 172 of the patient 150. A pull belt 125 is wound posteriorly about the neck 180 of the patient 150.

FIGS. 4C and 4D illustrate a patient 150 using the adjustable strap apparatus 100 as directed by a therapist according to step 440 of the cervical mobilization exercise method 400. FIG. 4C illustrates the head 185 of the patient 150 oscillating within a range right of the start position, with the first forearm and the second forearm of the patient vertically overlapping. FIG. 4D illustrates the head 185 of the patient 150 oscillating within a range left of the start position, with the first forearm and the second forearm of the patient laterally level with each other. The first wrist 171 and the second wrist 172 of the patient 150 pull anteriorly against the pull belt 125 wound posteriorly about the neck 180 of the patient 150 without a hand of the patient 150 grasping the first pull loop or the second pull loop.

Figure 5A:
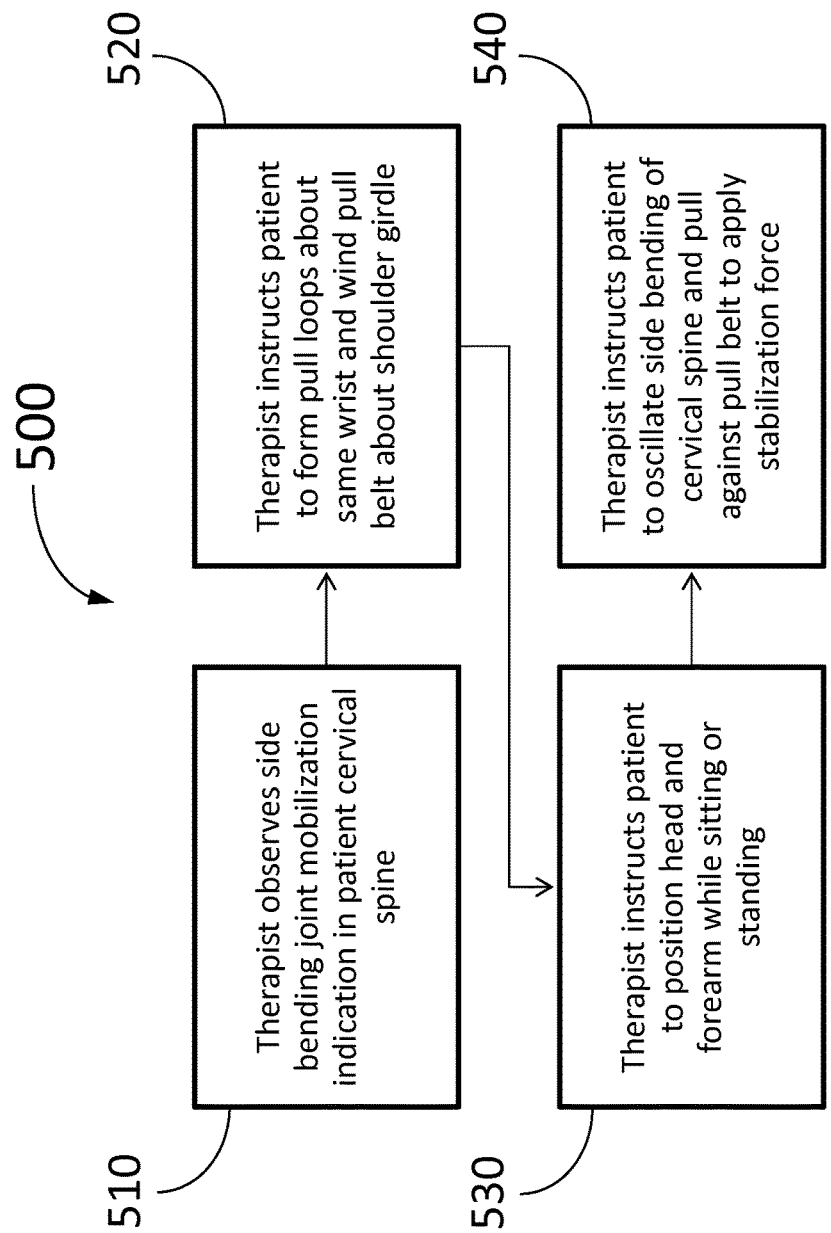
FIG. 5A illustrates a cervical side bend mobilization exercise method according to an embodiment of the present invention.

FIG. 5A illustrates a cervical side bend mobilization exercise method 500 according to an embodiment of the present invention. According to a first step 510 of the cervical side bend mobilization exercise method 500, a therapist may observe a side bending joint mobilization indication in the cervical spine of a patient. A cervical spine joint may exhibit a side bending joint mobilization indication on the left side or the right side of the patient, where the side of the cervical spine joint exhibiting the joint mobilization indication is referred to as the "exhibiting side," and the side of the cervical spine joint other than the shoulder joint exhibiting the joint mobilization indication is referred to as the "opposing side." A cervical spine joint exhibiting a joint mobilization indication may be a facet joint.

According to a next step 520 of the cervical side bend mobilization exercise method 500, the therapist may instruct the patient to engage the first outer hook patch 102 with one of the outer lateral loop patch 106, the inner lateral loop patch 107, or the medial loop patch 108 to form a pull loop about the opposing side wrist of the patient; instruct the patient to engage the second outer hook patch 105 with one of the outer lateral loop patch 110, the inner lateral loop patch 109, or the medial loop patch 108 to form a pull loop about the same opposing side wrist of the patient; and instruct the patient to wind a length of the strap 101 forming a pull belt posteriorly about the exhibiting side shoulder girdle of the patient.

According to a next step 530 of the cervical side bend mobilization exercise method 500, the therapist may instruct the patient to, while sitting or standing, position the head of the patient facing anteriorly (the "start position") and position the opposing side forearm of the patient anteriorly in a leveled posture such that the pull belt portion of the strap 101 winds posteriorly about the exhibiting side shoulder girdle of the patient abutting against the neck of the patient; and such that the pull loops about the opposing side wrist of the patient are each raised approximately level to the abdomen of the patient.

According to a next step 540 of the cervical side bend mobilization exercise method 500, the therapist may direct the patient to bend the neck of the patient laterally to the end of a range on the opposing side of the start position, and then direct the patient to oscillate the side bending of the cervical spine of the patient within the range on the opposing side of the start position, such that during the course of the oscillations, the opposing side wrist may pull anteriorly against the pull belt wound posteriorly about the exhibiting side shoulder girdle without a hand of the patient grasping the first pull loop or the second pull loop, to apply a stabilization force against the cervical spine of the patient.

FIGS. 5B and 5C illustrate a patient 150 using the adjustable strap apparatus 100 as directed by a therapist according to step 530 of the cervical side bend mobilization exercise method 500. The head 185 of the patient 150 is positioned in the start position. A first pull loop 121 and a second pull loop 122 are both about the opposing side wrist of the patient 150. A pull belt 125 is wound posteriorly about the exhibiting side shoulder girdle of the patient 150.

Figure 6A:
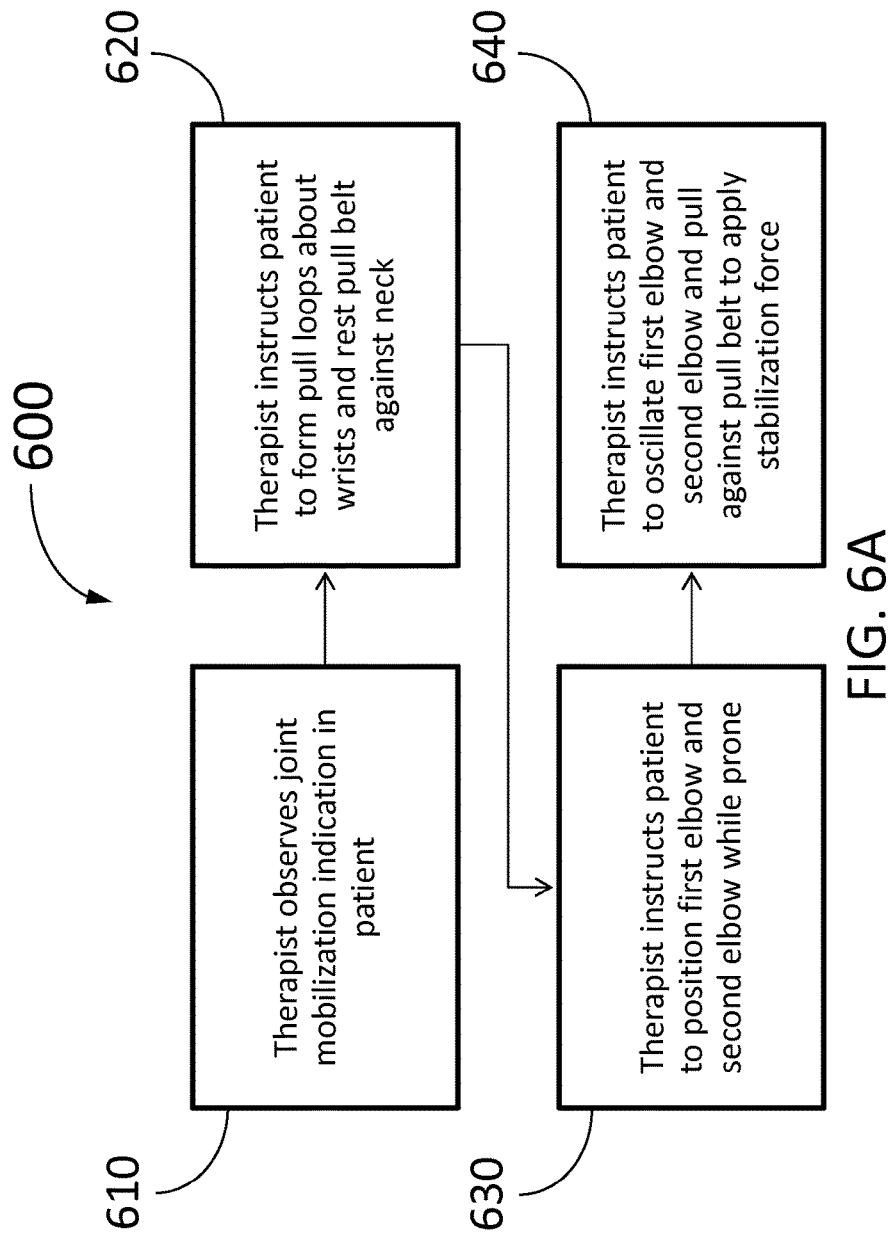
FIG. 6A illustrates a thoracic mobilization exercise method according to an embodiment of the present invention.

FIG. 6A illustrates a thoracic mobilization exercise method 600 according to an embodiment of the present invention. According to a first step 610 of the thoracic mobilization exercise method 600, a therapist may observe a joint mobilization indication in a thoracic joint of a patient. A thoracic joint exhibiting a joint mobilization indication may be a facet joint.

According to a next step 620 of the thoracic mobilization exercise method 600, the therapist may instruct the patient to engage the first outer hook patch 102 with one of the outer lateral loop patch 106, the inner lateral loop patch 107, or the medial loop patch 108 to form a pull loop about a first palm of the patient; instruct the patient to engage the second outer hook patch 105 with one of the outer lateral loop patch 110, the inner lateral loop patch 109, or the medial loop patch 108 to form a pull loop about a second palm of the patient; and instruct the patient to wind a length of the strap 101 under both arms of the patient, forming a pull belt posteriorly about the abdomen of the patient.

According to a next step 630 of the thoracic mobilization exercise method 600, the therapist may instruct the patient to, while in a prone position, press both palms downward against a flat surface such that the pull loop about the first wrist of the patient and the pull loop about the second wrist of the patient are each pulled downward, such that the pull belt portion of the strap 101 is pulled taut posteriorly about the abdomen of the patient and under both arms of the patient.

According to a next step 640 of the thoracic mobilization exercise method 600, the therapist may direct the patient to oscillate the thoracic joint exhibiting a joint mobilization indication within a range of motion, such that during the course of the oscillations, the first palm and the second palm may pull anteriorly against the pull belt wound posteriorly about the abdomen of the patient and under both arms of the patient without a hand of the patient grasping the first pull loop or the second pull loop, to apply a stabilization force against the thoracic joint of the patient exhibiting a joint mobilization indication.

Figure 6B:
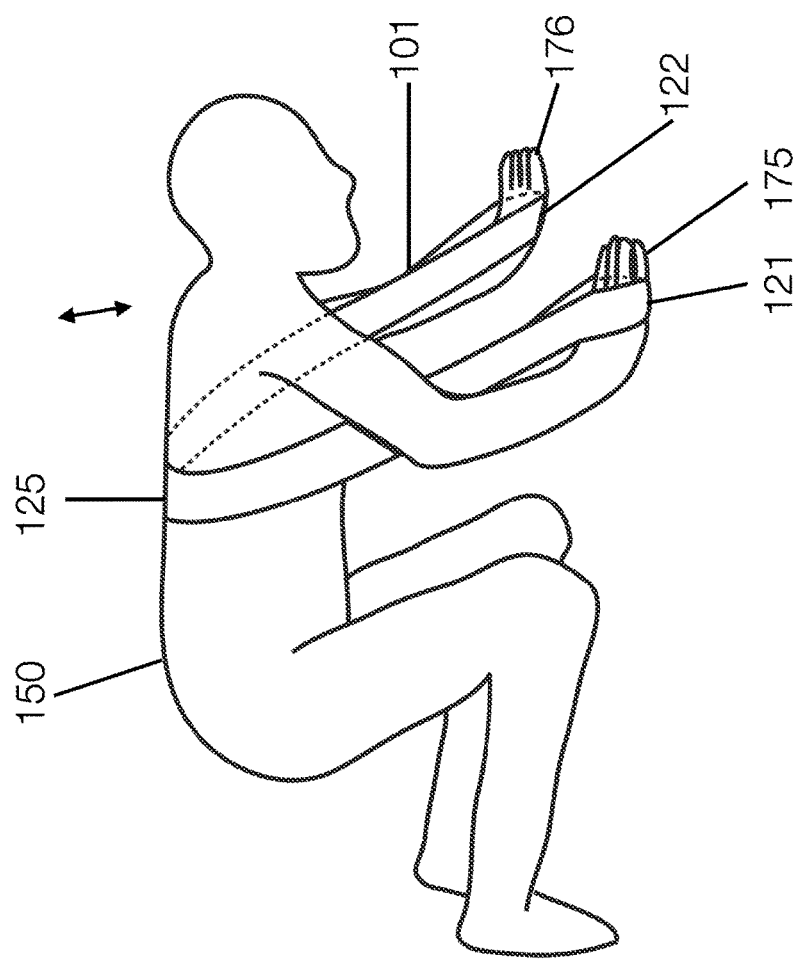
FIG. 6B illustrates a patient using the adjustable strap apparatus of FIG. 1 as directed by a therapist according to a step of the thoracic mobilization exercise method.

FIG. 6B illustrates a patient 150 using the adjustable strap apparatus 100 as directed by a therapist according to step 640 of the thoracic mobilization exercise method 600. The thoracic joint of the patient 150 exhibiting a joint mobilization indication is oscillating within a range. The first palm 175 and the second palm 176 of the patient 150 pull anteriorly against the pull belt 125 pulled taut posteriorly about the abdomen of the patient and under both arms of the patient without a hand of the patient 150 grasping the first pull loop or the second pull loop.

Figure 7A:
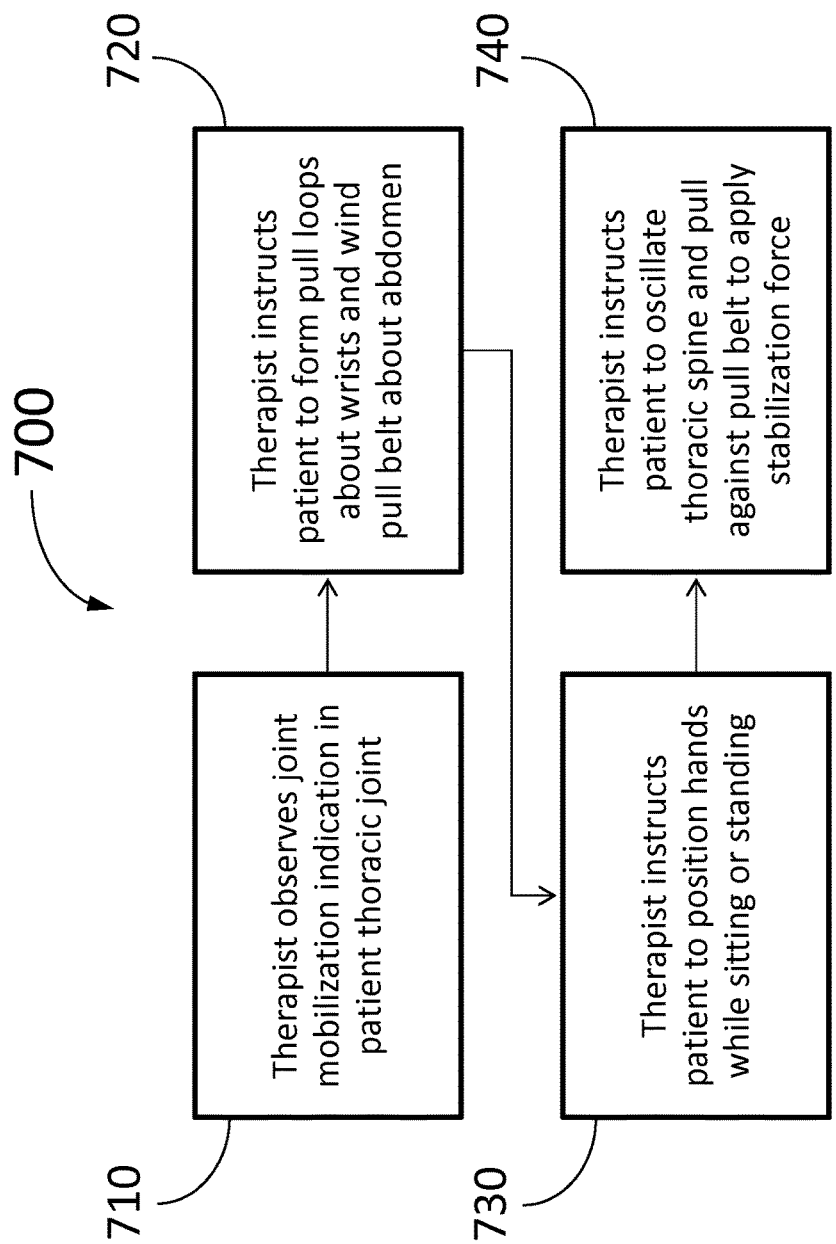
FIG. 7A illustrates a sitting or standing thoracic mobilization exercise method according to an embodiment of the present invention.

FIG. 7A illustrates a sitting or standing thoracic mobilization exercise method 700 according to an embodiment of the present invention. According to a first step 710 of the sitting or standing thoracic mobilization exercise method 700, a therapist may observe a joint mobilization indication in a thoracic joint of a patient. A thoracic joint exhibiting a joint mobilization indication may be a facet joint.

According to a next step 720 of the sitting or standing thoracic mobilization exercise method 700, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to engage the second outer hook patch 105 with one of the outer lateral loop patch 110, the inner lateral loop patch 109, or the medial loop patch 108 to form a pull loop about a second wrist of the patient; and instruct the patient to wind a length of the strap 101 under both arms of the patient, forming a pull belt posteriorly about the abdomen of the patient.

According to a next step 730 of the sitting or standing thoracic mobilization exercise method 700, the therapist may instruct the patient to, while in a sitting or standing position, clasp both hands together anteriorly such that the pull loop about the first wrist of the patient and the pull loop about the second wrist of the patient are each pulled anteriorly, such that the pull belt portion of the strap 101 is pulled taut posteriorly about the abdomen of the patient and under both arms of the patient.

According to a next step 740 of the thoracic mobilization exercise method 700, the therapist may direct the patient to oscillate the thoracic spine exhibiting a joint mobilization indication within a range of motion, such that during the course of the oscillations, the first wrist and the second wrist may pull anteriorly against the pull belt wound posteriorly about the abdomen of the patient and under both arms of the patient without a hand of the patient grasping the first pull loop or the second pull loop, to apply a stabilization force against the thoracic joint of the patient exhibiting a joint mobilization indication.

Figure 7B:
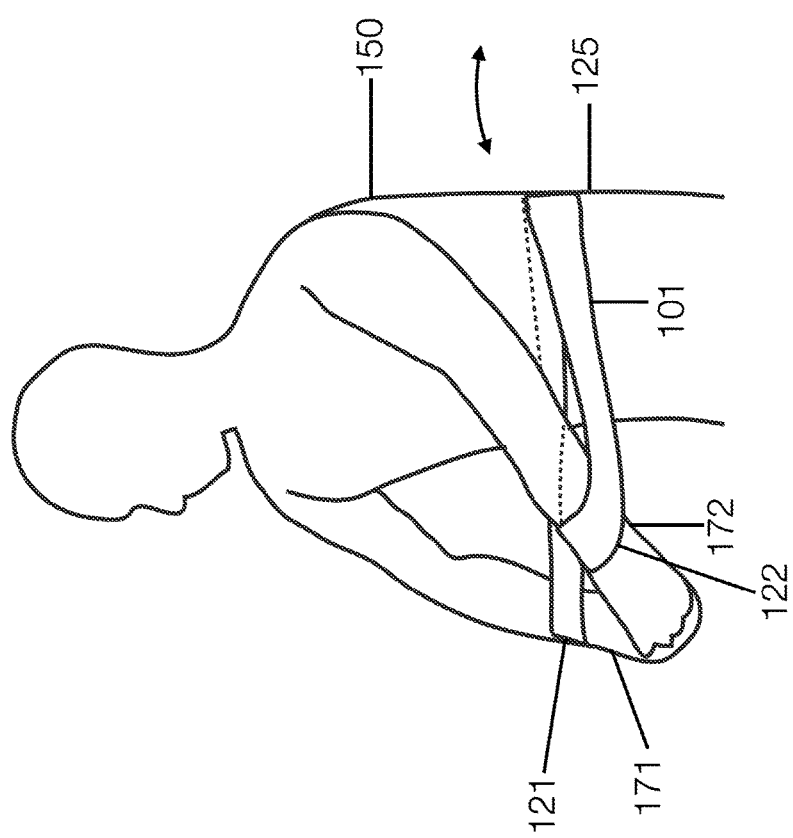
FIG. 7B illustrates a patient using the adjustable strap apparatus of FIG. 1 as directed by a therapist according to a step of the sitting or standing thoracic mobilization exercise method.

FIG. 7B illustrates a patient 150 using the adjustable strap apparatus 100 as directed by a therapist according to step 740 of the sitting or standing thoracic mobilization exercise method 700. The thoracic joint of the patient 150 exhibiting a joint mobilization indication is oscillating within a range. The first wrist 171 and the second wrist 172 of the patient 150 pull anteriorly against the pull belt 125 pulled taut posteriorly about the abdomen of the patient and under both arms of the patient without a hand of the patient 150 grasping the first pull loop or the second pull loop.

Figure 8A:
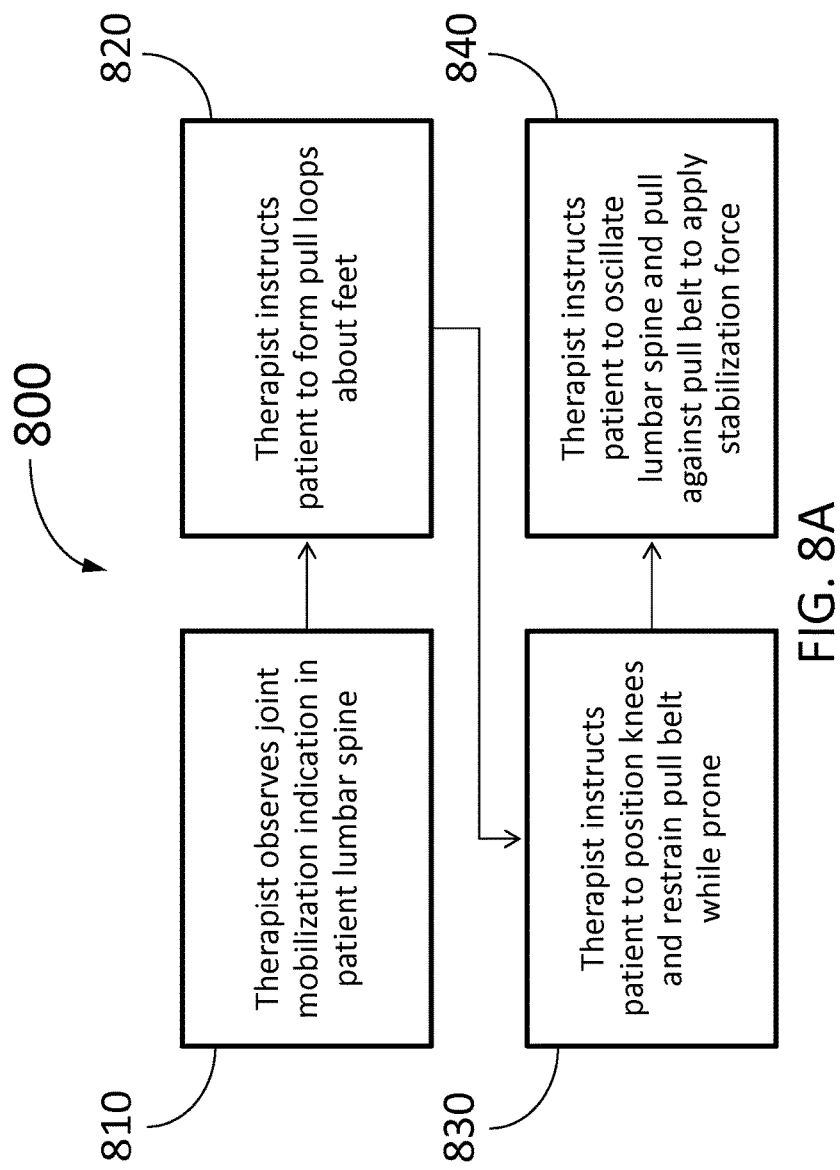
FIG. 8A illustrates a lumbar spine mobilization exercise method according to an embodiment of the present invention.

FIG. 8A illustrates a lumbar spine mobilization exercise method 800 according to an embodiment of the present invention. According to a first step 810 of the lumbar spine mobilization exercise method 800, a therapist may observe a joint mobilization indication in a lumbar joint of a patient. A lumbar joint exhibiting a joint mobilization indication may be a facet joint.

According to a next step 820 of the lumbar spine mobilization exercise method 800, the therapist may instruct the patient to engage the first outer hook patch 102 with one of the outer lateral loop patch 106, the inner lateral loop patch 107, or the medial loop patch 108 to form a pull loop about a first foot of the patient and instruct the patient to engage the second outer hook patch 105 with one of the outer lateral loop patch 110, the inner lateral loop patch 109, or the medial loop patch 108 to form a pull loop about a second foot of the patient.

According to a next step 830 of the lumbar spine mobilization exercise method 800, the therapist may instruct the patient to, while in a prone position, flex both knees posteriorly and restrain the pull belt portion of the strap 101 superiorly from posterior to the back of the patient such that the pull loop about the first foot of the patient and the pull loop about the second foot of the patient are each pulled superiorly.

According to a next step 840 of the lumbar spine mobilization exercise method 800, the therapist may direct the patient to oscillate the lumbar spine within a range of motion, such that during the course of the oscillations, the first foot and the second foot may pull inferiorly against the restrained pull belt posteriorly to the back of the patient without a hand of the patient grasping the first pull loop or the second pull loop, to apply a stabilization force against the thoracic joint of the patient exhibiting a joint mobilization indication.

Figure 8B:
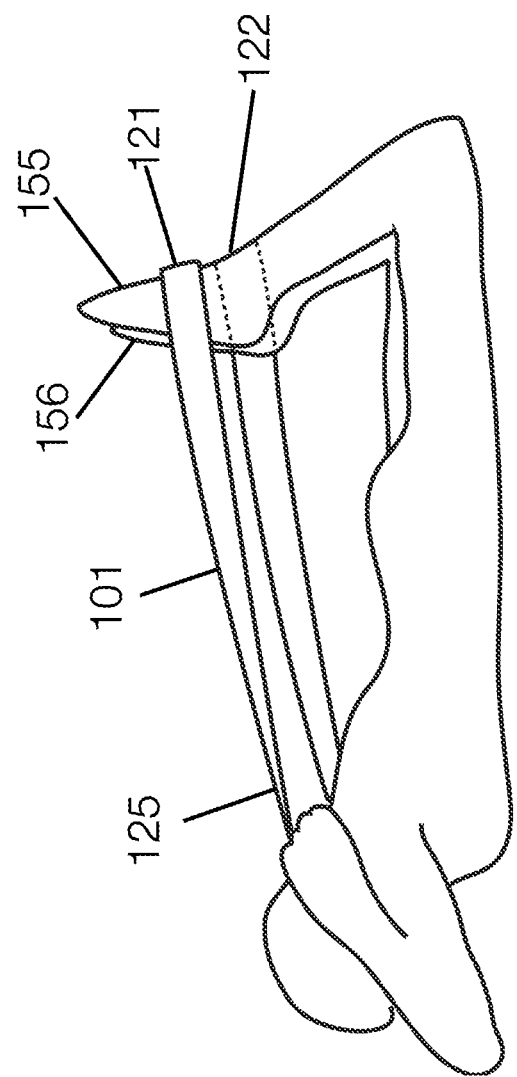
FIG. 8B illustrates a patient using the adjustable strap apparatus of FIG. 1 as directed by a therapist according to a step of the lumbar spine mobilization exercise method.

FIG. 8B illustrates a patient 150 using the adjustable strap apparatus 100 as directed by a therapist according to step 840 of the lumbar spine mobilization exercise method 800. The lumbar spine of the patient 150 is oscillating within a range. The first foot 155 and the second foot 156 of the patient 150 pull inferiorly against the pull belt 125 that has been restrained posteriorly to the back of the patient without a hand of the patient 150 grasping the first pull loop or the second pull loop.

Figure 9A:
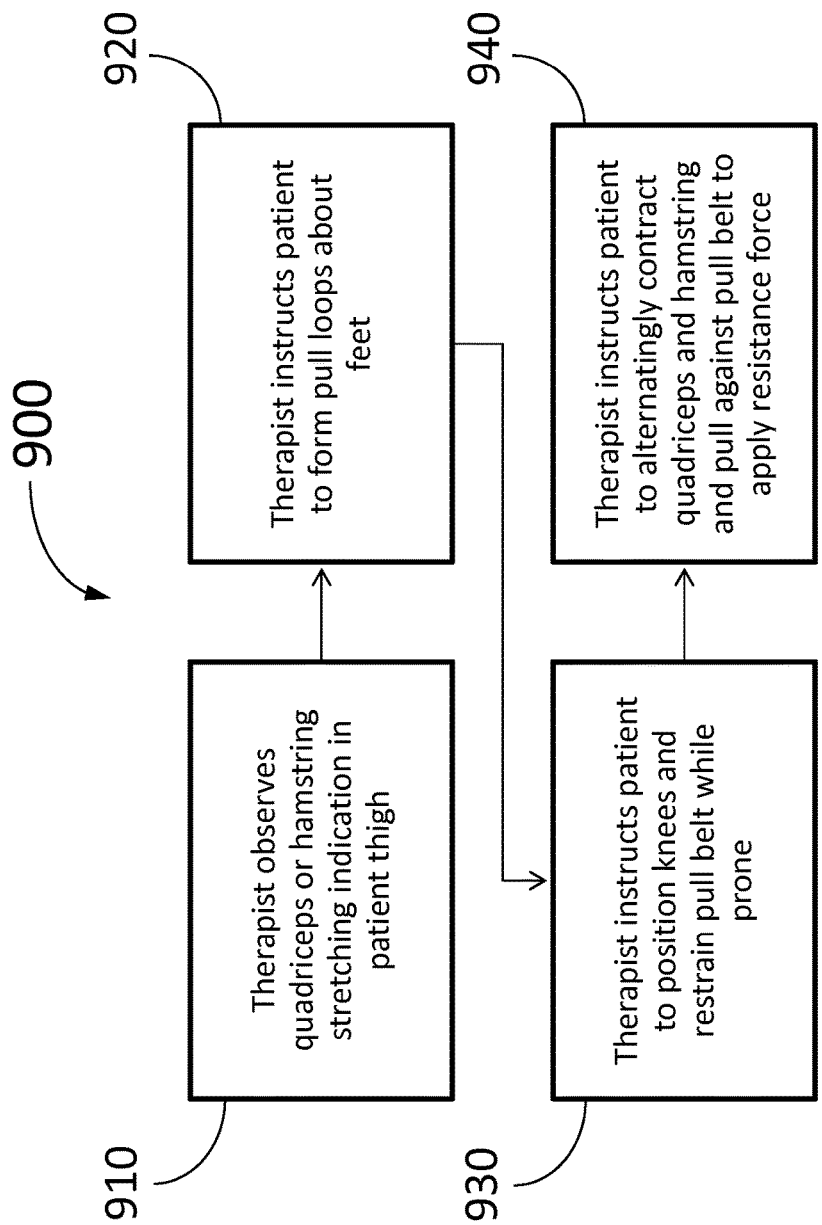
FIG. 9A illustrates a quadriceps and hamstring stretch exercise method according to an embodiment of the present invention.

FIG. 9A illustrates a quadriceps and hamstring stretch exercise method 900 according to an embodiment of the present invention. According to a first step 910 of the quadriceps and hamstring stretch exercise method 900, a therapist may observe a quadriceps stretching indication or a hamstring stretching indication in a thigh of a patient. A thigh exhibiting a quadriceps stretching indication or a hamstring stretching indication may be the left thigh or the right thigh of the patient, where the side of the thigh exhibiting the stretching indication is referred to as the "exhibiting side," and the side of the thigh other than the thigh exhibiting the stretching indication is referred to as the "opposing side."

According to a next step 920 of the quadriceps and hamstring stretch exercise method 900, the therapist may instruct the patient to engage the first outer hook patch 102 with one of the outer lateral loop patch 106, the inner lateral loop patch 107, or the medial loop patch 108 to form a pull loop about a first foot of the patient and instruct the patient to engage the second outer hook patch 105 with one of the outer lateral loop patch 110, the inner lateral loop patch 109, or the medial loop patch 108 to form a pull loop about a second foot of the patient.

According to a next step 930 of the quadriceps and hamstring stretch exercise method 900, the therapist may instruct the patient to, while in a prone position, flex both knees posteriorly and restrain the pull belt portion of the strap 101 superiorly from posterior to the back of the patient such that the pull loop about the first foot of the patient and the pull loop about the second foot of the patient are each pulled superiorly.

According to a next step 940 of the quadriceps and hamstring stretch exercise method 900, the therapist may direct the patient to alternatingly contract the exhibiting side quadriceps and the exhibiting side hamstring, such that the exhibiting side foot and the opposing side foot may pull inferiorly against the restrained pull belt posteriorly to the back of the patient without a hand of the patient grasping the first pull loop or the second pull loop, to apply a resistance force against the contraction of the exhibiting side quadriceps and the exhibiting side hamstring.

Figure 9B:
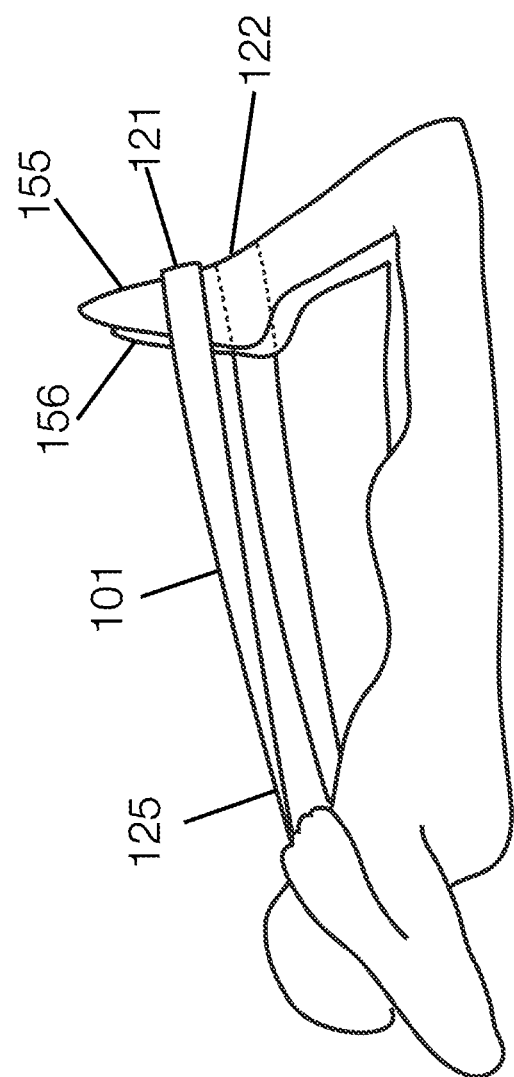
FIG. 9B illustrates a patient using the adjustable strap apparatus of FIG. 1 as directed by a therapist according to a step of the quadriceps and hamstring stretch exercise method.

FIG. 9B illustrates a patient 150 using the adjustable strap apparatus 100 as directed by a therapist according to step 940 of the quadriceps and hamstring stretch exercise method 900. The first foot 155 and the second foot 156 of the patient 150 pull inferiorly against the pull belt 125 that has been restrained posteriorly to the back of the patient without a hand of the patient 150 grasping the first pull loop or the second pull loop.

Figure 10A:
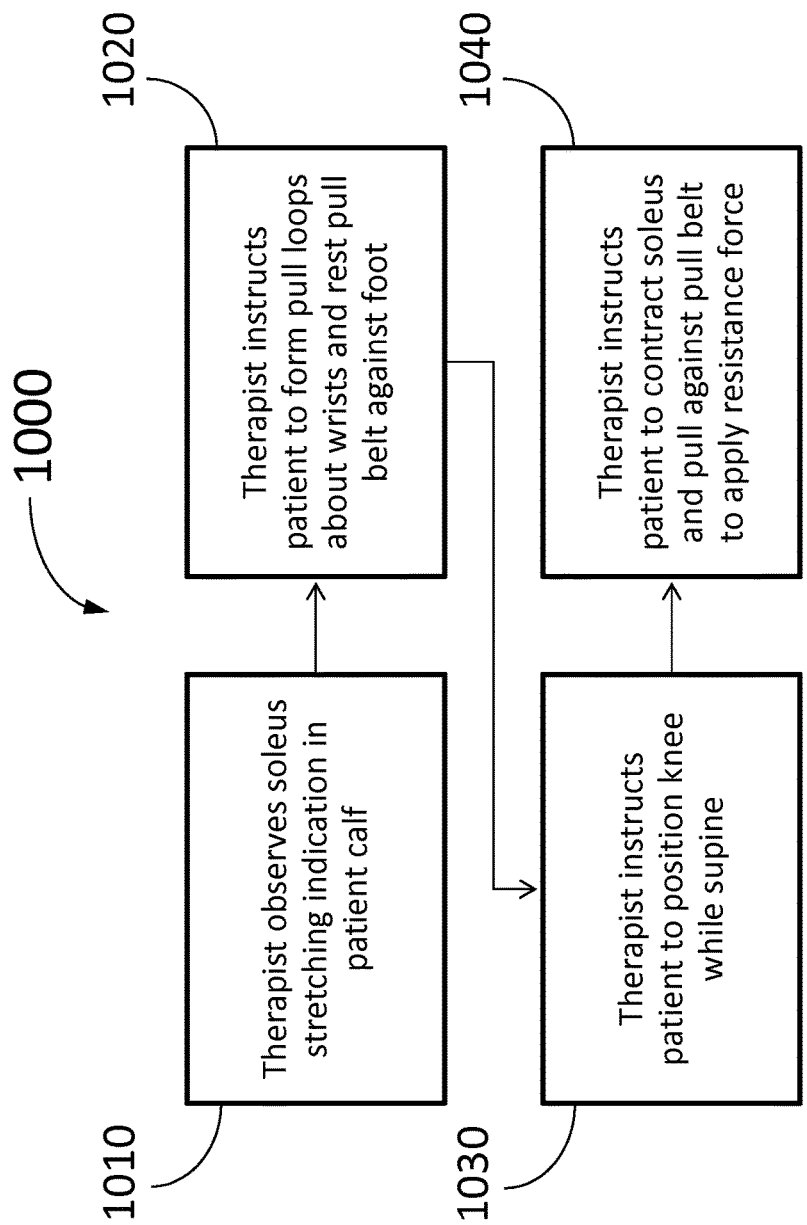
FIG. 10A illustrates a soleus stretch exercise method according to an embodiment of the present invention.

FIG. 10A illustrates a soleus stretch exercise method 1000 according to an embodiment of the present invention. According to a first step 1010 of the soleus stretch exercise method 1000, a therapist may observe a soleus stretching indication in a calf of a patient. A calf exhibiting a soleus stretching indication may be the left calf or the right calf of the patient, where the side of the calf exhibiting the stretching indication is referred to as the "exhibiting side," and the side of the calf other than the calf exhibiting the stretching indication is referred to as the "opposing side."

According to a next step 1020 of the soleus stretch exercise method 1000, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to engage the second outer hook patch 105 with one of the outer lateral loop patch 110, the inner lateral loop patch 109, or the medial loop patch 108 to form a pull loop about a second wrist of the patient; and instruct the patient to wind a length of the strap 101 under the exhibiting side foot of the patient, forming a pull belt inferiorly about the exhibiting side foot of the patient.

According to a next step 1030 of the soleus stretch exercise method 1000, the therapist may instruct the patient to, while in a supine position, flex the exhibiting side knee superiorly and anteriorly, and wind the pull belt portion of the strap 101 under the exhibiting side foot of the patient such that the pull loop about the first wrist of the patient and the pull loop about the second wrist of the patient pull the pull belt portion of the strap 101 superiorly and posteriorly.

According to a next step 1040 of the soleus stretch exercise method 1000, the therapist may direct the patient to contract the exhibiting side soleus, such that the first wrist and the second wrist of the patient may pull superiorly and posteriorly against the pull belt without a hand of the patient grasping the first pull loop or the second pull loop, to apply a resistance force against the contraction of the exhibiting side soleus.

FIG. 10B illustrates a patient 150 using the adjustable strap apparatus 100 as directed by a therapist according to step 1040 of the soleus stretch exercise method 1000. The first wrist 171 and the second wrist 172 of the patient pull superiorly and posteriorly against the pull belt 125 that has been wound under the exhibiting side foot 195 of the patient 150, without a hand of the patient 150 grasping the first pull loop or the second pull loop.

Figure 11A:
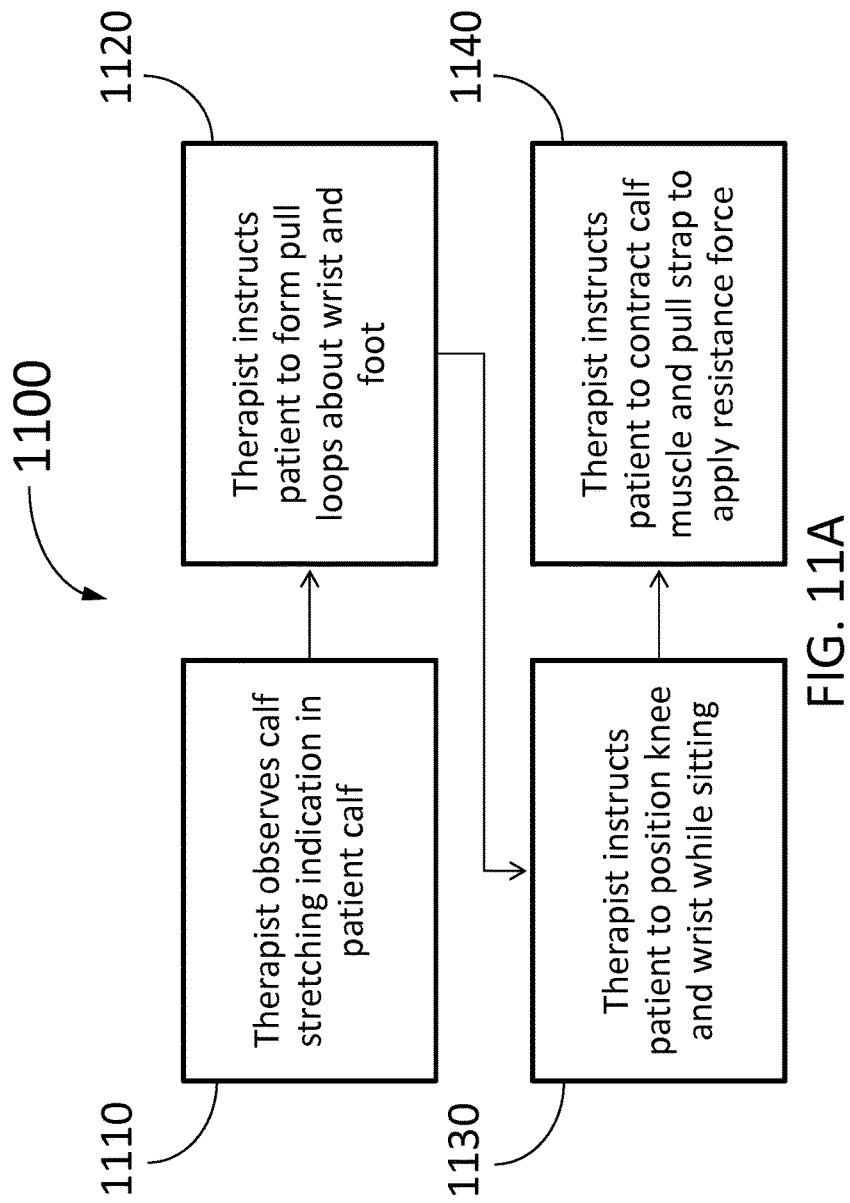
FIG. 11A illustrates a calf stretch exercise method according to an embodiment of the present invention.

FIG. 11A illustrates a calf stretch exercise method 1100 according to an embodiment of the present invention. According to a first step 1110 of the calf stretch exercise method 1100, a therapist may observe a calf stretching indication in a calf of a patient. A calf exhibiting a calf stretching indication may be the left calf or the right calf of the patient, where the side of the calf exhibiting the stretching indication is referred to as the "exhibiting side," and the side of the calf other than the calf exhibiting the stretching indication is referred to as the "opposing side." A calf muscle exhibiting the stretching indication may be the gastrocnemius muscle, the soleus muscle, the tibialis muscle, or any other muscle of the lower leg.

According to a next step 1120 of the calf stretch exercise method 1100, the therapist may instruct the patient to engage the first outer hook patch 102 with one of the outer lateral loop patch 106, the inner lateral loop patch 107, or the medial loop patch 108 to form a pull loop about a wrist of the patient and instruct the patient to engage the second outer hook patch 105 with one of the outer lateral loop patch 110, the inner lateral loop patch 109, or the medial loop patch 108 to form a pull loop about the exhibiting side foot of the patient.

According to a next step 1130 of the calf stretch exercise method 1100, the therapist may instruct the patient to, while in a sitting position, extend the exhibiting side knee anteriorly, and flex the wrist of the patient posteriorly such that the strap 101 is pulled taut in an anterior-posterior direction by the pull loop about the wrist of the patient and the pull loop about the exhibiting side foot of the patient.

According to a next step 1140 of the calf stretch exercise method 1100, the therapist may direct the patient to contract the calf muscle exhibiting the stretching indication, such that the wrist of the patient may pull the strap 101 posteriorly against the exhibiting side foot of the patient pulling anteriorly without a hand of the patient grasping the first pull loop or the second pull loop, to apply a resistance force against the contraction of the calf muscle exhibiting the stretching indication.

Figure 11B:
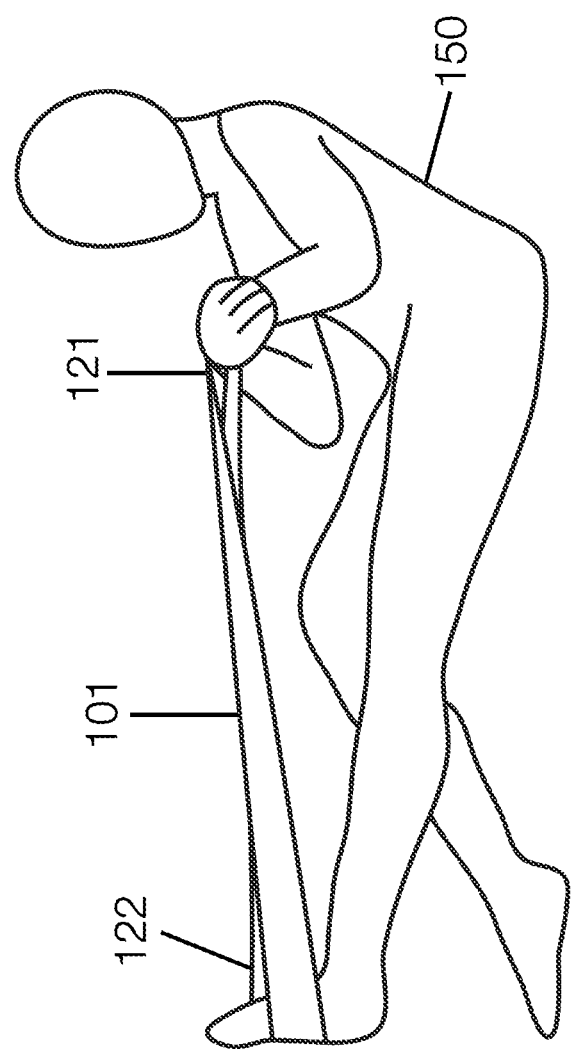
FIG. 11B illustrates a patient using the adjustable strap apparatus of FIG. 1 as directed by a therapist according to a step of the calf stretch exercise method.

FIG. 11B illustrates a patient 150 using the adjustable strap apparatus 100 as directed by a therapist according to step 1140 of the calf stretch exercise method 1100. The wrist of the patient pulls the strap 101 posteriorly against the exhibiting side foot of the patient pulling anteriorly without a hand of the patient 150 grasping the first pull loop or the second pull loop.

Figure 12A:
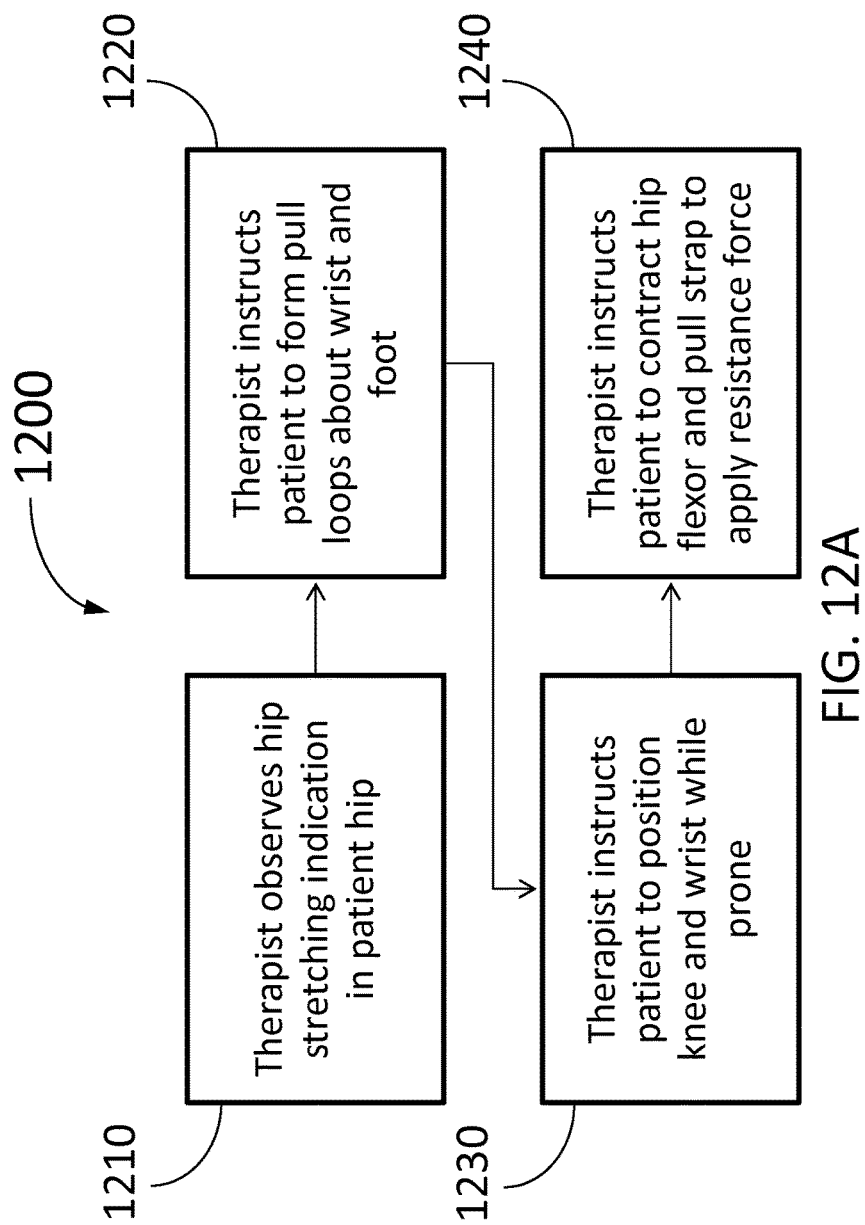
FIG. 12A illustrates a hip flexor and quadriceps stretch exercise method according to an embodiment of the present invention.

FIG. 12A illustrates a hip flexor and quadriceps stretch exercise method 1200 according to an embodiment of the present invention. According to a first step 1210 of the hip flexor and quadriceps stretch exercise method 1200, a therapist may observe a hip flexor stretching indication in a hip of a patient. A hip exhibiting a hip stretching indication may be the left hip or the right hip of the patient, where the side of the hip exhibiting the stretching indication is referred to as the "exhibiting side," and the side of the hip other than the hip exhibiting the stretching indication is referred to as the "opposing side." A hip flexor muscle exhibiting the stretching indication may be the gastrocnemius muscle or any other flexor muscle of the hip.

According to a next step 1220 of the hip flexor and quadriceps stretch exercise method 1200, the therapist may instruct the patient to engage the first outer hook patch 102 with one of the outer lateral loop patch 106, the inner lateral loop patch 107, or the medial loop patch 108 to form a pull loop about a wrist of the patient and instruct the patient to engage the second outer hook patch 105 with one of the outer lateral loop patch 110, the inner lateral loop patch 109, or the medial loop patch 108 to form a pull loop about the exhibiting side foot of the patient.

According to a next step 1230 of the hip flexor and quadriceps stretch exercise method 1200, the therapist may instruct the patient to, while in a prone position, flex the exhibiting side knee posteriorly, and flex the wrist of the patient posteriorly such that the strap 101 is pulled taut in a superior-inferior direction by the pull loop about the wrist of the patient and the pull loop about the exhibiting side foot of the patient.

According to a first alternate next step 1230 of the hip flexor and quadriceps stretch exercise method 1200, the therapist may instruct the patient to, while in a lying position on the opposing side of the body of the patient, flex the exhibiting side knee posteriorly, and flex the wrist of the patient anteriorly over the chest of the patient such that the strap 101 is pulled taut in a superior-inferior direction by the pull loop about the wrist of the patient and the pull loop about the exhibiting side foot of the patient.

According to a second alternate next step 1230 of the hip flexor and quadriceps stretch exercise method 1200, the therapist may instruct the patient to, while in a standing position, flex the exhibiting side knee posteriorly, and flex the wrist of the patient anteriorly over the chest of the patient such that the strap 101 is pulled taut in a superior-inferior direction by the pull loop about the wrist of the patient and the pull loop about the exhibiting side foot of the patient.

According to a third alternate next step 1230 of the hip flexor and quadriceps stretch exercise method 1200, the therapist may instruct the patient to, while in a standing position with a support, flex the exhibiting side knee posteriorly, and flex the wrist of the patient anteriorly over the chest of the patient such that the strap 101 is pulled taut in a superior-inferior direction by the pull loop about the wrist of the patient and the pull loop about the exhibiting side foot of the patient.

According to a next step 1240 of the hip flexor and quadriceps stretch exercise method 1200, the therapist may direct the patient to contract the hip flexor muscle exhibiting the stretching indication, such that the wrist of the patient may pull the strap 101 posteriorly against the exhibiting side foot of the patient pulling anteriorly without a hand of the patient grasping the first pull loop or the second pull loop, to apply a resistance force against the contraction of the hip flexor muscle exhibiting the stretching indication.

Figure 12B:
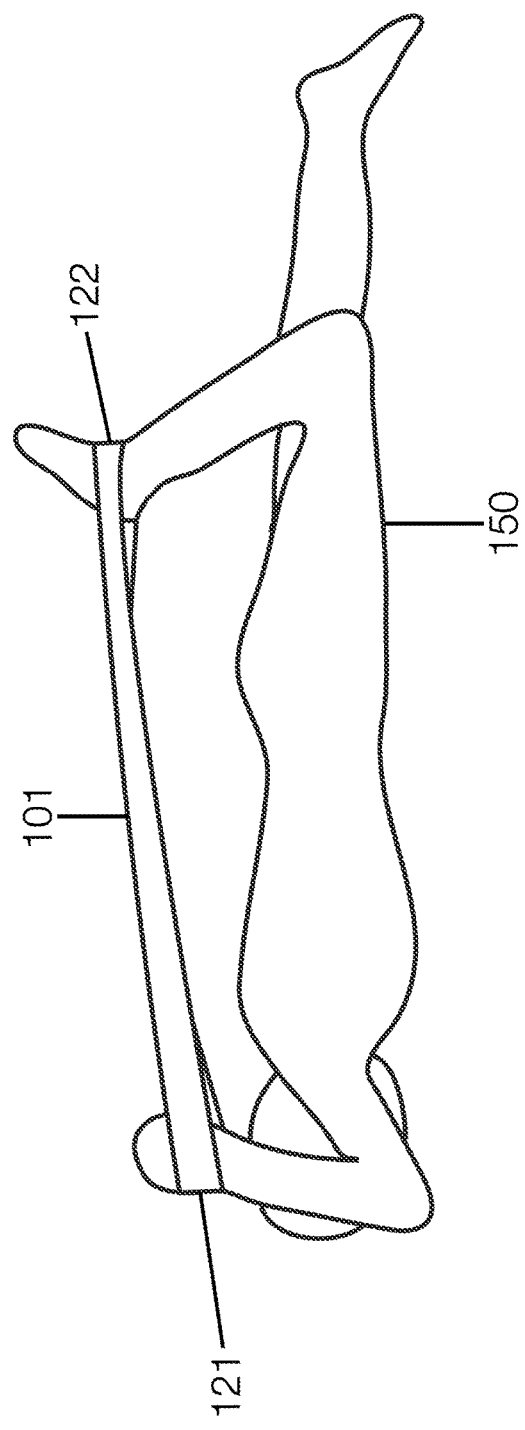
FIGS. 12B through 12E illustrate a patient using the adjustable strap apparatus of FIG. 1 as directed by a therapist according to alternate steps of the hip flexor and quadriceps stretch exercise method.
Figure 12C:
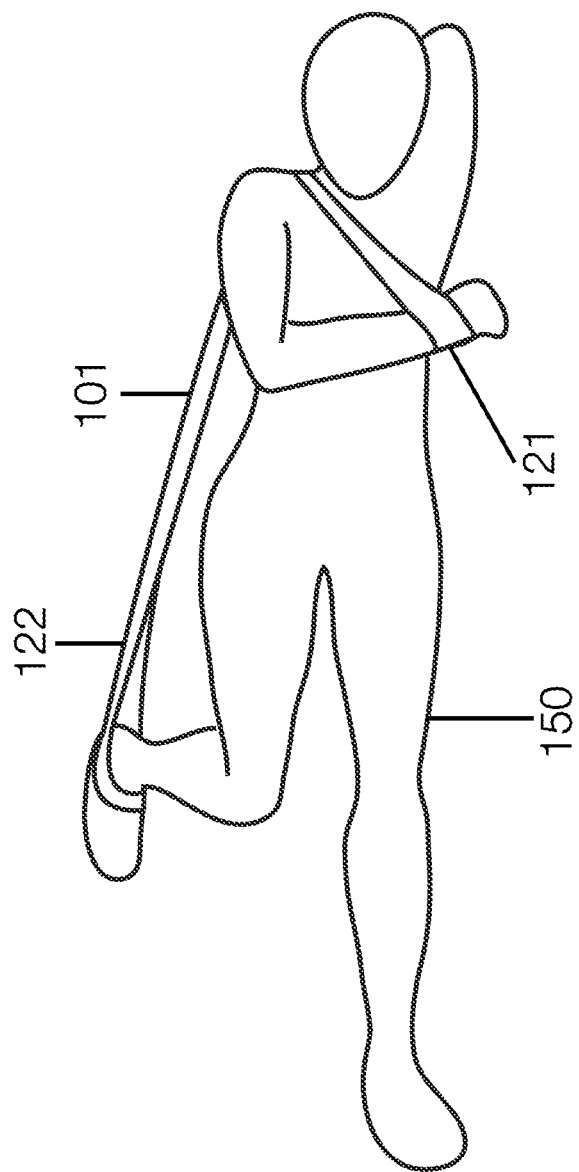
Figure 12E:
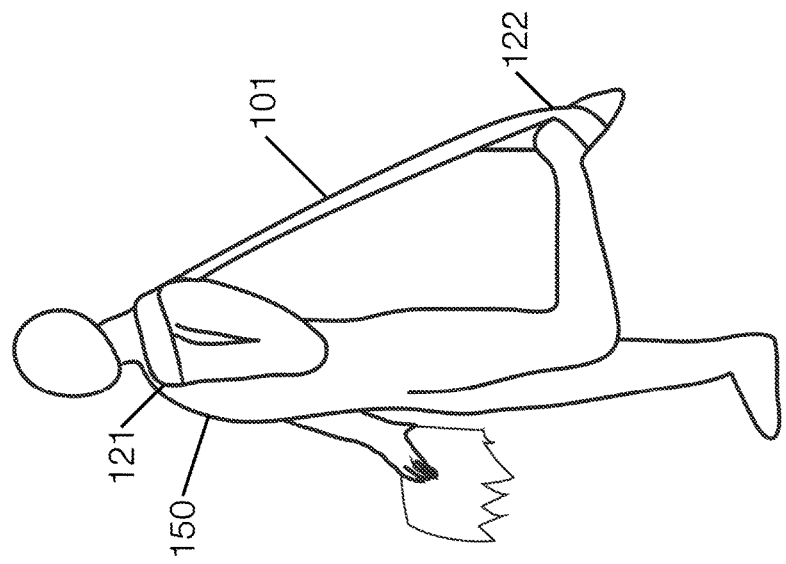
Figure 12D:
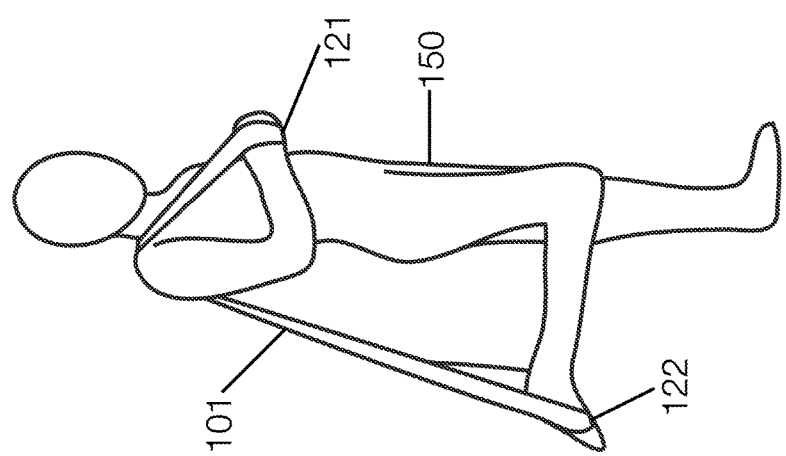

FIG. 12B illustrates a patient 150 using the adjustable strap apparatus 100 as directed by a therapist according to step 1230 of the hip flexor and quadriceps stretch exercise method 1200. FIGS. 12C through 12E illustrate a patient 150 using the adjustable strap apparatus 100 as directed by a therapist according to a first, second, and third alternate steps 1230 of the hip flexor and quadriceps stretch exercise method 1200. The wrist of the patient pulls the strap 101 posteriorly against the exhibiting side foot of the patient pulling anteriorly without a hand of the patient 150 grasping the first pull loop or the second pull loop.

Figure 13A:
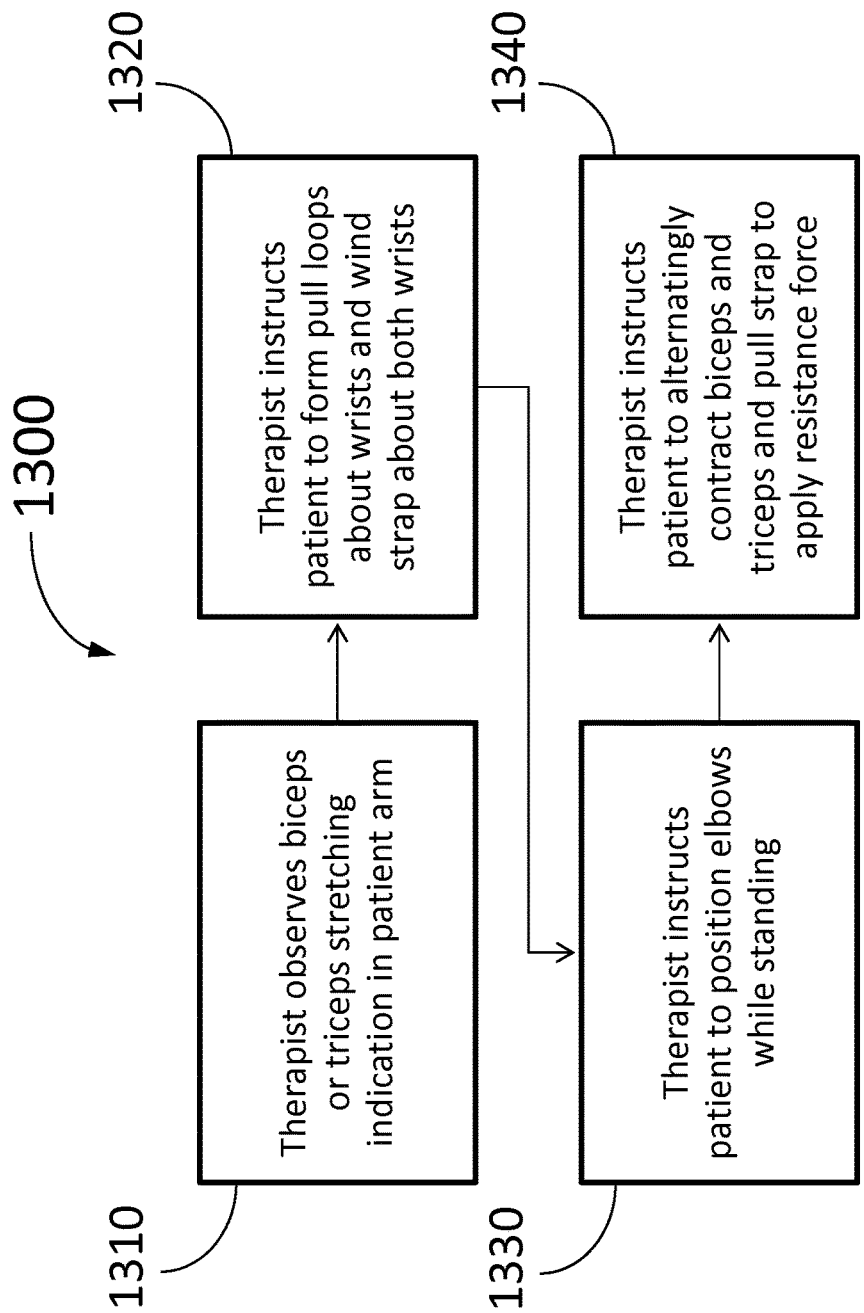
FIG. 13A illustrates a biceps and triceps stretch exercise method according to an embodiment of the present invention.

FIG. 13A illustrates a biceps and triceps stretch exercise method 1300 according to an embodiment of the present invention. According to a first step 1310 of the biceps and triceps stretch exercise method 1300, a therapist may observe a biceps stretching indication or a triceps stretching indication in an arm of a patient. An arm exhibiting a soleus stretching indication may be the left arm or the right arm of the patient, where the side of the arm exhibiting the stretching indication is referred to as the "exhibiting side," and the side of the arm other than the arm exhibiting the stretching indication is referred to as the "opposing side."

According to a next step 1320 of the biceps and triceps stretch exercise method 1300, the therapist may instruct the patient to engage the first outer hook patch 102 with one of the outer lateral loop patch 106, the inner lateral loop patch 107, or the medial loop patch 108 to form a pull loop about a first wrist of the patient; instruct the patient to wind a length of the strap 101 about both wrists of the patient with both wrists posterior to the back of the patient; and instruct the patient to engage the second outer hook patch 105 with one of the outer lateral loop patch 110, the inner lateral loop patch 109, or the medial loop patch 108 to form a pull loop about a second wrist of the patient.

According to a next step 1330 of the biceps and triceps stretch exercise method 1300, the therapist may instruct the patient to, while in a standing position, flex both elbows posteriorly and laterally such that the pull loop about the first wrist of the patient and the pull loop about the second wrist of the patient pull against each other.

According to a next step 1340 of the biceps and triceps stretch exercise method 1300, the therapist may direct the patient to alternatingly contract the exhibiting side biceps and the exhibiting side triceps, such that the first wrist and the second wrist may pull posteriorly and laterally against the strap 101 without a hand of the patient grasping the first pull loop or the second pull loop, to apply a resistance force against the contraction of the exhibiting side biceps and the exhibiting side triceps.

Figure 13B:
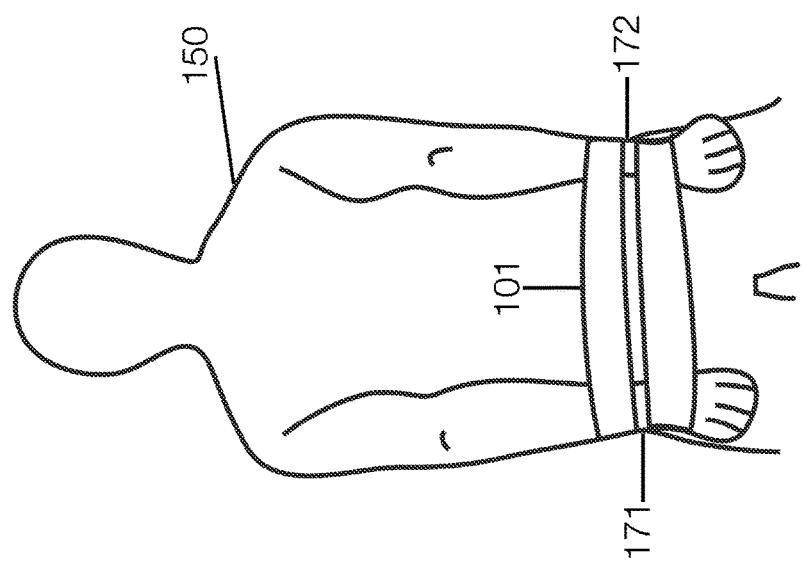
FIG. 13B illustrates a patient using the adjustable strap apparatus of FIG. 1 as directed by a therapist according to a step of the biceps and triceps stretch exercise method.

FIG. 13B illustrates a patient 150 using the adjustable strap apparatus 100 as directed by a therapist according to step 1340 of the biceps and triceps stretch exercise method 1300. The first wrist 171 and the second wrist 172 of the patient pull posteriorly and laterally against the strap 101 that has been wound about both wrists of the patient 150, without a hand of the patient 150 grasping the first pull loop or the second pull loop.

Figure 14A:
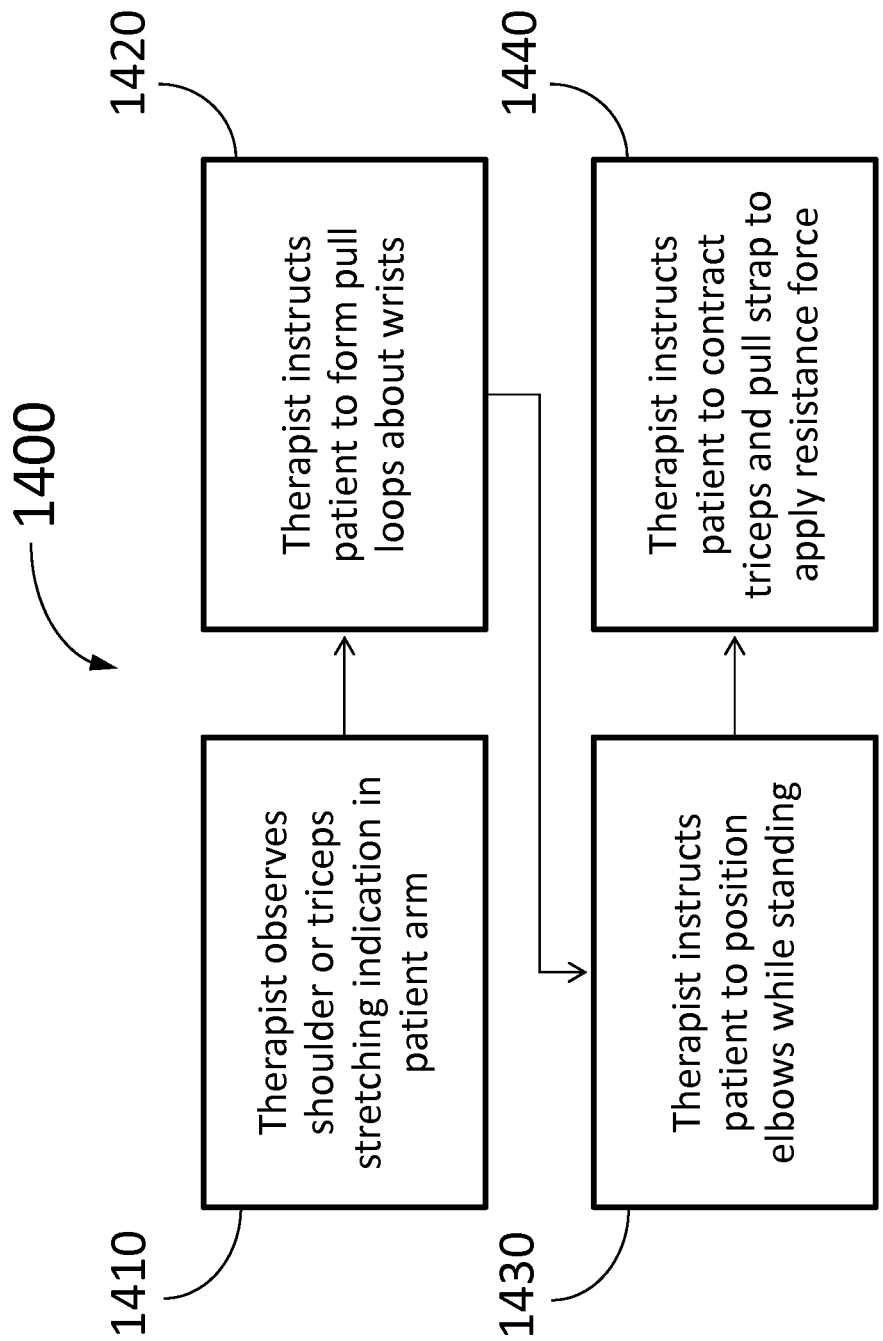
FIG. 14A illustrates a shoulder and triceps stretch exercise method according to an embodiment of the present invention.

FIG. 14A illustrates a shoulder and triceps stretch exercise method 1400 according to an embodiment of the present invention. According to a first step 1410 of the shoulder and triceps stretch exercise method 1400, a therapist may observe a shoulder stretching indication or a triceps stretching indication in an arm of a patient. An arm exhibiting a shoulder or triceps stretching indication may be the left arm or the right arm of the patient, where the side of the arm exhibiting the stretching indication is referred to as the "exhibiting side," and the side of the arm other than the arm exhibiting the stretching indication is referred to as the "opposing side."

According to a next step 1420 of the shoulder and triceps stretch exercise method 1400, the therapist may instruct the patient to engage the first outer hook patch 102 with one of the outer lateral loop patch 106, the inner lateral loop patch 107, or the medial loop patch 108 to form a pull loop about a first wrist of the patient; and instruct the patient to engage the second outer hook patch 105 with one of the outer lateral loop patch 110, the inner lateral loop patch 109, or the medial loop patch 108 to form a pull loop about a second wrist of the patient.

According to a next step 1430 of the shoulder and triceps stretch exercise method 1400, the therapist may instruct the patient to, while in a standing position, flex the exhibiting side elbow posteriorly and superiorly and the opposing side elbow posteriorly and inferiorly such that the pull loop about the first wrist of the patient and the pull loop about the second wrist of the patient pull against each other in a superior-inferior direction posterior to the back of the patient.

According to a next step 1440 of the shoulder and triceps stretch exercise method 1400, the therapist may direct the patient to contract the exhibiting side shoulder muscle and triceps while internally rotating the opposing side wrist, such that the opposing side wrist may pull inferiorly against the strap 101 without a hand of the patient grasping the first pull loop or the second pull loop, to apply a resistance force against the contraction of the exhibiting triceps.

Figure 14B:
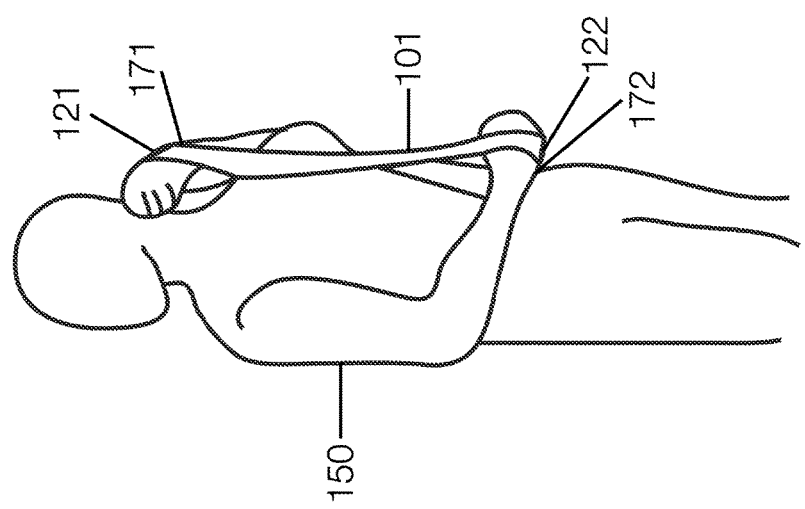
FIG. 14B illustrates a patient using the adjustable strap apparatus of FIG. 1 as directed by a therapist according to a step of the shoulder and triceps stretch exercise method.

FIG. 14B illustrates a patient 150 using the adjustable strap apparatus 100 as directed by a therapist according to step 1440 of the shoulder and triceps stretch exercise method 1400. The first wrist 171 and the second wrist 172 of the patient pull in a superior-inferior direction against the strap 101, without a hand of the patient 150 grasping the first pull loop or the second pull loop.

Embodiments of the present invention provide an apparatus for the application of stabilization or resistance forces in the performance of a variety of mobilization and stretching exercises. A therapist may instruct a patient to perform mobilization and stretching exercises using an apparatus of the present invention and self-apply stabilization and resistance forces without aid of the therapist and without the need to grasp the apparatus using hands. This use of the present invention is particularly important for patients who are unable to apply a force using hands due to various types of injury.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:
1. An adjustable strap apparatus, comprising:
a strap having a first end and a second end; and
a first outer hook patch, a first inner hook patch, a first outer lateral loop patch, a first inner lateral loop patch, a medial loop patch, a second inner lateral loop patch, a second outer lateral loop patch, a second inner hook patch, and a second outer hook patch each joined to the strap;

wherein a hook patch is removably engageable with a loop patch to form a pull loop from the length of the strap between the engaged hook patch and the engaged loop patch.

2. The adjustable strap apparatus of claim 1, wherein a first of the hook patches is removably engageable with a loop patch to form a first pull loop from the length of the strap between the engaged first of the hook patches and the engaged loop patch; and a second of the hook patches is removably engageable with a loop patch to form a second pull loop from the length of the strap between the engaged second of the hook patches and the engaged loop patch.

3. The adjustable strap apparatus of claim 2, wherein a length of the strap not forming the first pull loop or the second pull loop forms a pull belt.

4. The adjustable strap apparatus of claim 2, wherein a first of the hook patches and a second of the hook patches are each removably engageable with a loop patch to form a first pull loop from the length of the strap between the engaged first and second of the hook patches and the engaged loop patch; and a third of the hook patches and a fourth of the hook patches are each removably engageable with a loop patch to form a second pull loop from the length of the strap between the engaged third and fourth of the hook patches and the engaged loop patch.

\* \* \* \* \*